(12) United States Patent  (10) Patent No.: US 7,585,663 B2
Shigeura et al.  (45) Date of Patent: Sep. 8, 2009

(54) THERMAL DEVICE, SYSTEM, AND METHOD, FOR FLUID PROCESSING DEVICE

(75) Inventors: John S. Shigeura, Portola Valley, CA (US); Janice G. Shigeura, legal representative, Portola Valley, CA (US); Sean M. Desmond, San Carlos, CA (US); David M. Cox, Foster City, CA (US)

(73) Assignee: Applied Biosystems, LLC, Carlsbad, CA (US)

( * ) Notice: Subject to any disclaimer, the term of this patent is extended or adjusted under 35 U.S.C. 154(b) by 784 days.

(21) Appl. No.: 10/926,915

(22) Filed: Aug. 26, 2004

(65) Prior Publication Data

US 2006/0046304 A1 Mar. 2, 2006

(51) Int. Cl.
C12M 1/34 (2006.01)
C12M 3/00 (2006.01)
C12P 19/34 (2006.01)

(52) U.S. Cl. .............. 435/287.2; 435/303.1; 435/809; 435/288.3; 435/288.4; 435/287.3; 435/147; 435/91.2; 165/240; 422/99; 422/102

(58) Field of Classification Search ............ 435/303.1, 435/809, 288.3, 288.4, 287.2, 287.3, 147, 435/91.2; 165/240; 422/99, 102
See application file for complete search history.

(56) References Cited

U.S. PATENT DOCUMENTS

| | | | |
|---|---|---|---|
| 5,061,630 A | 10/1991 | Knopf et al. | |
| 5,229,297 A | 7/1993 | Schnipelsky et al. | |
| 5,736,314 A | 4/1998 | Hayes et al. | |
| 6,372,486 B1 | 4/2002 | Fripp | |
| 6,503,750 B1 | 1/2003 | Benett et al. | |
| 6,692,700 B2 | 2/2004 | Handique | |
| 2002/0006619 A1 | 1/2002 | Cohen et al. | |
| 2002/0015995 A1 | 2/2002 | Blumenfeld et al. | |
| 2003/0008286 A1 | 1/2003 | Zou et al. | |
| 2003/0157563 A1* | 8/2003 | Danssaert et al. ............ 435/7.1 |
| 2005/0161192 A1* | 7/2005 | Shigeura et al. ............... 165/61 |
| 2006/0088931 A1* | 4/2006 | Ririe ....................... 435/304.1 |

OTHER PUBLICATIONS

Notification of Transmittal from PCT Application No. PCT/US05/22628.

(Continued)

Primary Examiner—William H Beisner
Assistant Examiner—Nathan A Bowers
(74) Attorney, Agent, or Firm—Andrew Finn; Len Bowersox

(57) ABSTRACT

A device, system, and method are provided for thermally treating a fluid processing device. According to various embodiments, a system is provided that can include a thermal device and a fluid processing device holder. The thermal device can include a first block having a thermal conductivity greater than 0.5 Watt per centimeter Kelvin (W/cm·K), a second block having a thermal conductivity greater than 0.5 W/cm·K, and a heat-pump device disposed between the first block and the second block. The heat-pump device can transfer thermal energy from at least one of the first block and the second block to the other of the first block and the second block. The fluid processing device holder can hold a fluid processing device in a heat-transfer position with respect to the first block and the second block. The fluid processing device can be a microfluidic device.

46 Claims, 11 Drawing Sheets

OTHER PUBLICATIONS

International Search Report dated Feb. 6, 2007, from PCT Application No. PCT/US05/22628.

Written Opinion of International Searching Authority dated Feb. 6, 2007, from PCT Application No. PCT/US05/22628.

Notification of Transmittal from PCT Application No. PCT/US2005/022628.

International Preliminary Report on Patentability dated Feb. 28, 2007, from PCT Application No. PCT/US2005/022628.

Written Opinion of International Searching Authority dated Feb. 6, 2007, from PCT Application No. PCT/US2005/022628.

David R. Lide, Ph.D., Editor, *CRC Handbook of Chemistry and Physics*, 80$^{th}$ Edition, p. 12-195 (one page) (1999-2000), CRC Press, VSA.

* cited by examiner

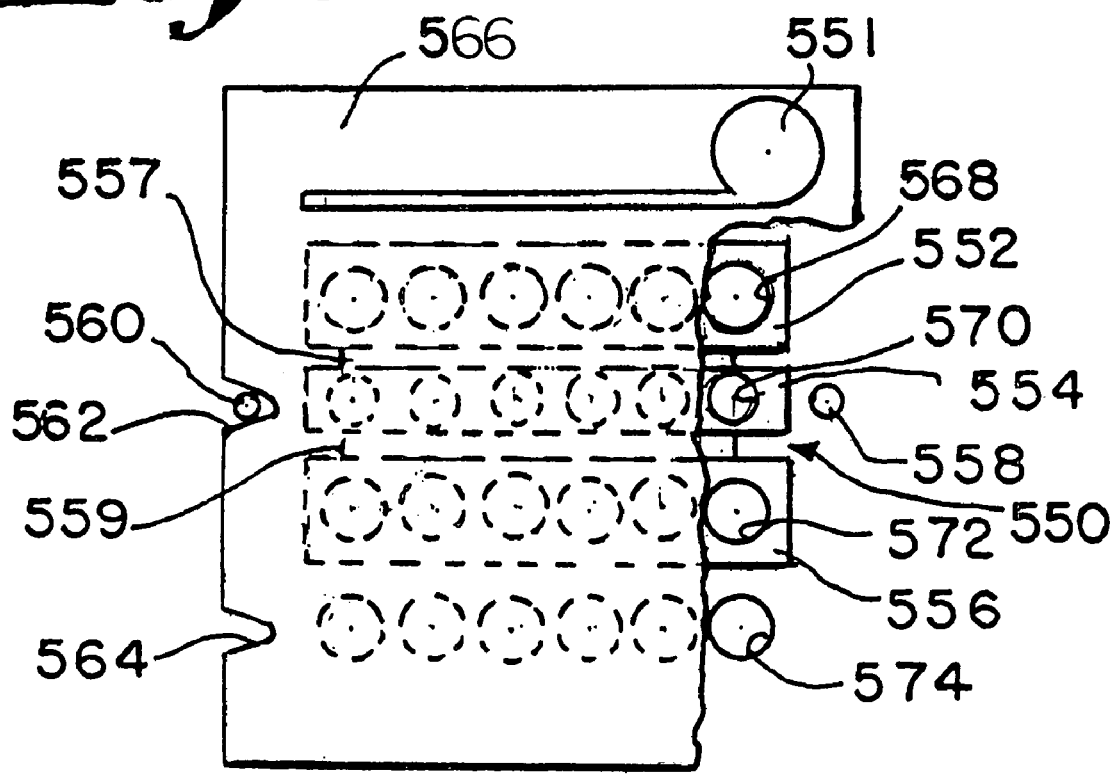

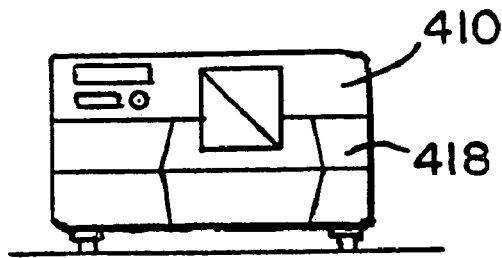
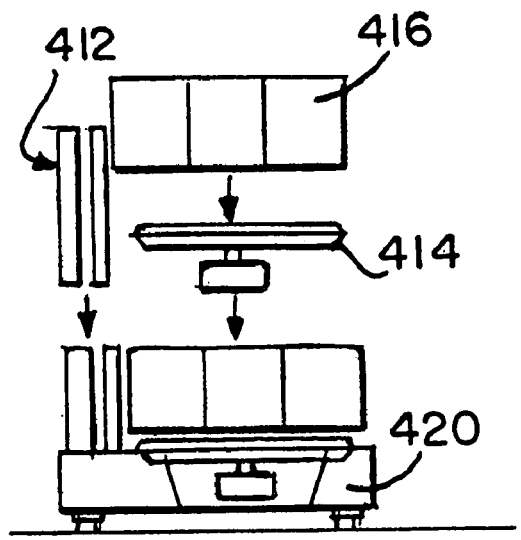
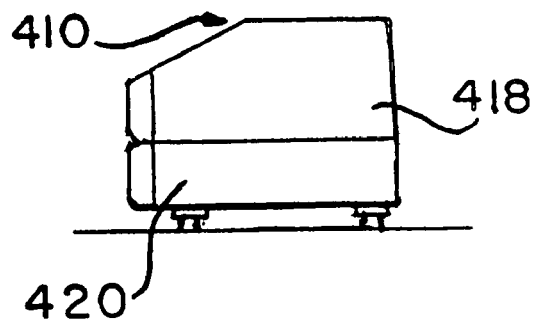
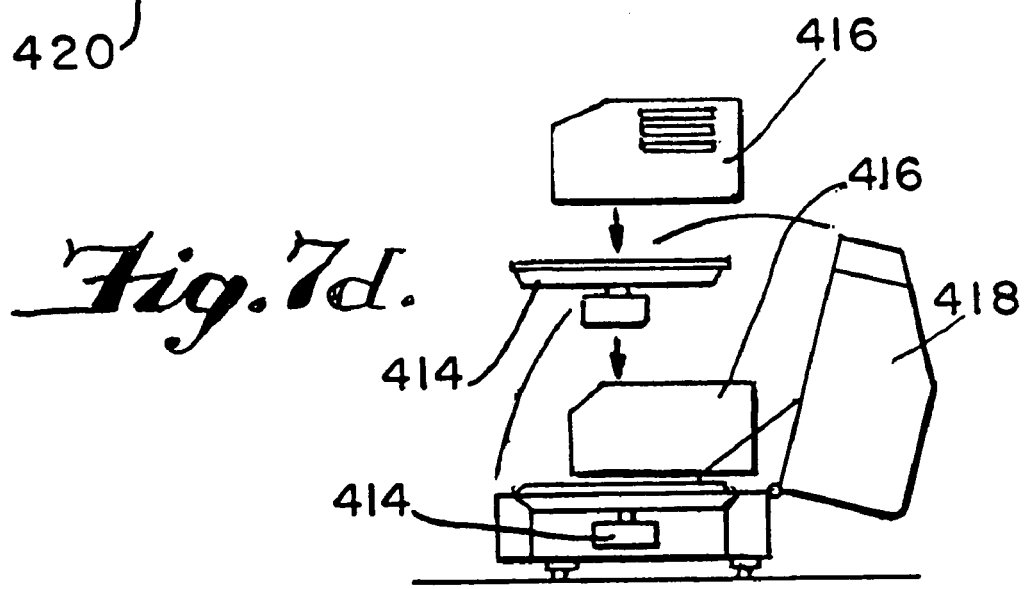

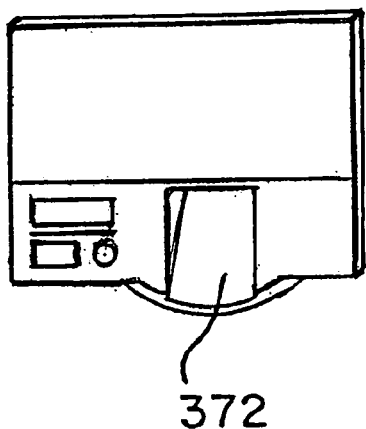
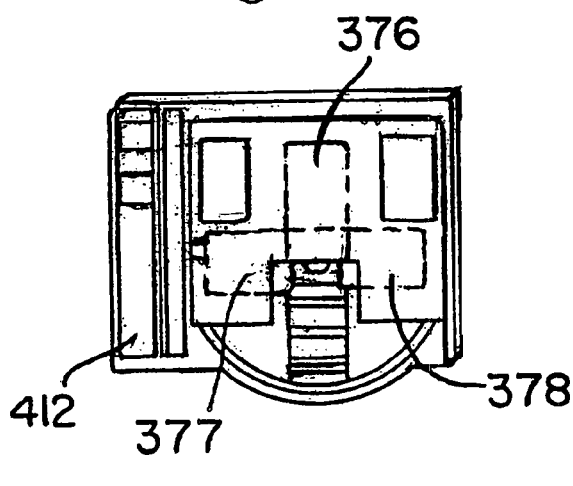
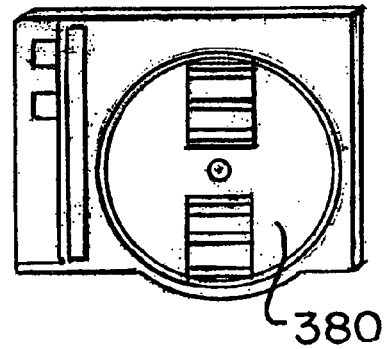
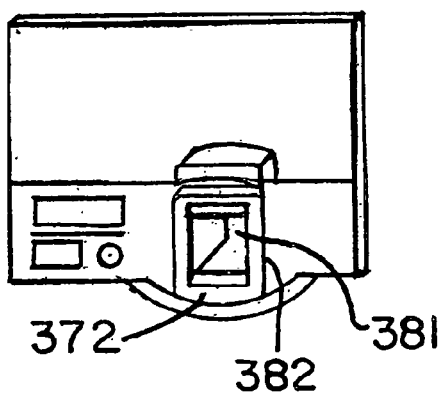
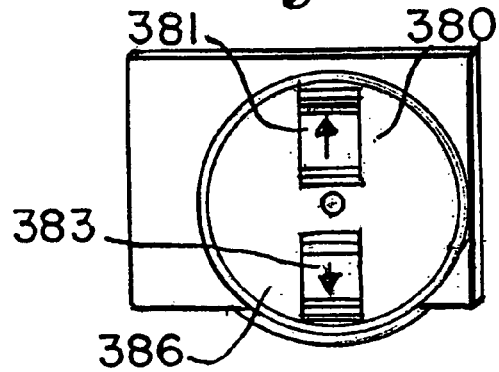

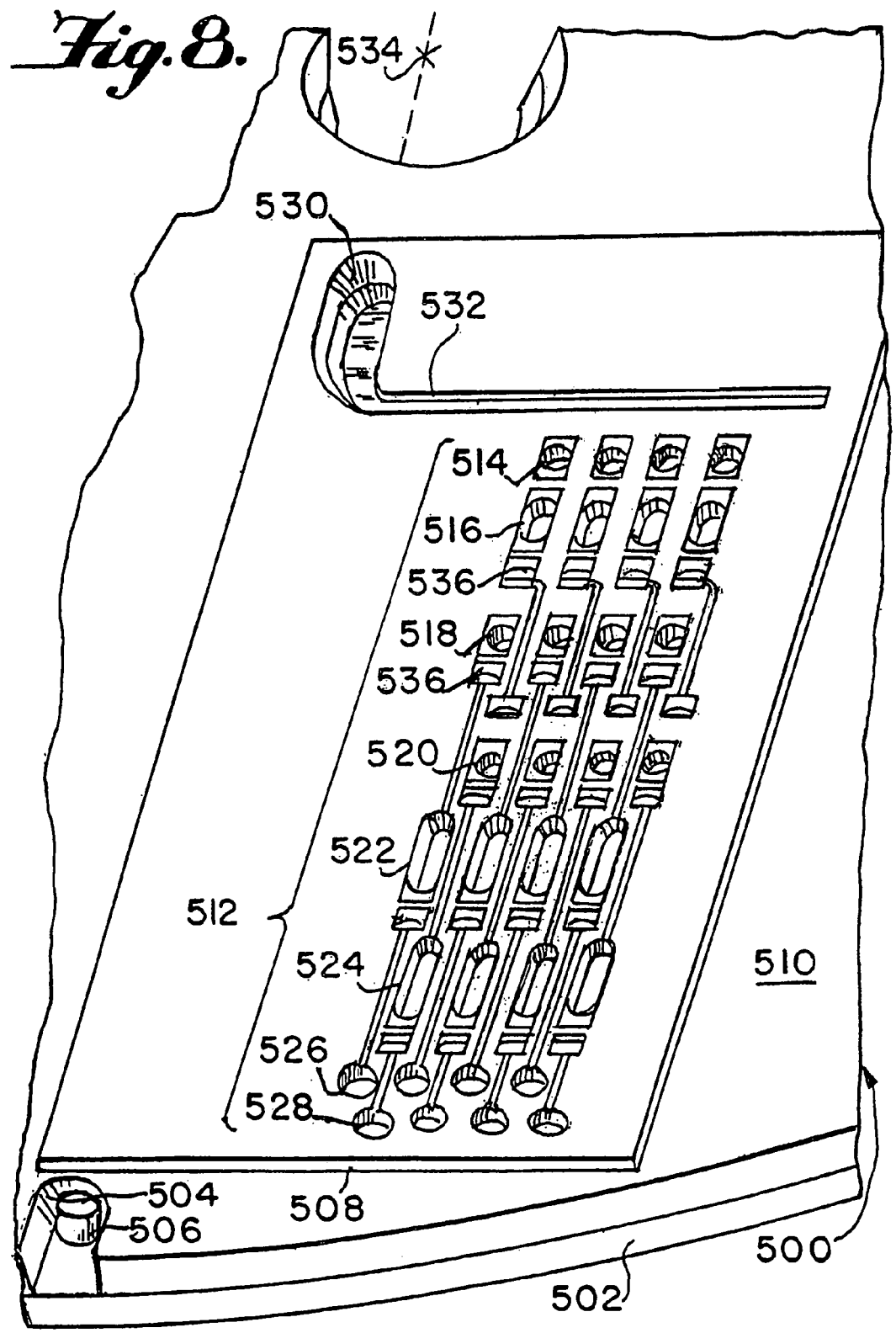

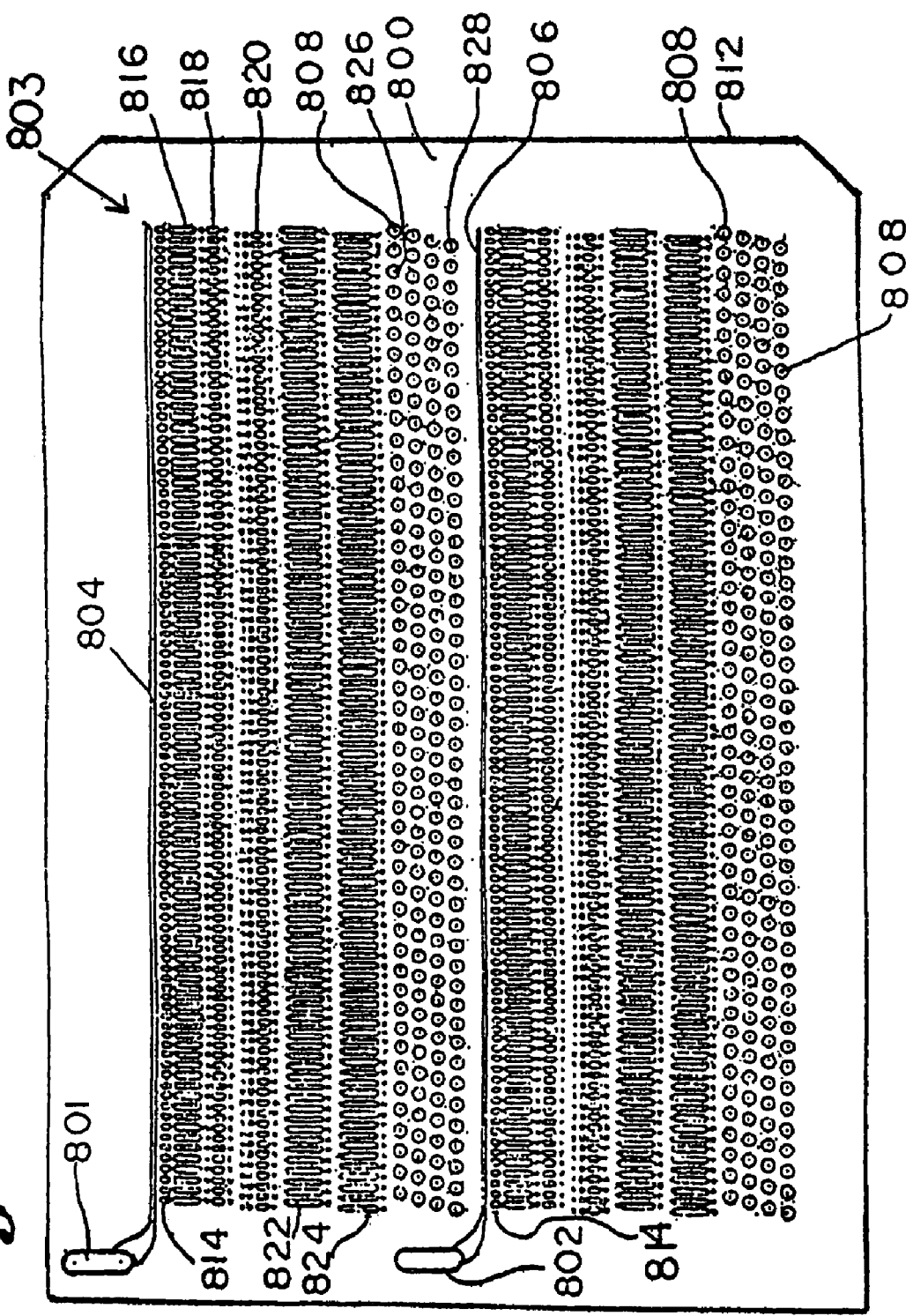

THERMAL DEVICE, SYSTEM, AND METHOD, FOR FLUID PROCESSING DEVICE

FIELD

The present teachings relate to a thermal energy manipulation system.

BACKGROUND

There is a need for a device that can provide efficient thermal cycling of a fluid in a retainment region of a fluid processing device while maintaining an adjacent second retainment region at a different temperature. A device compatible with biological or chemical reactions, for example, nucleotide amplification chemistries, and laboratory instrumentation adapted to process a relatively large number of biological/chemical reactions, is desirable.

BRIEF DESCRIPTION

According to various embodiments, a system is provided that can include a thermal device and a fluid processing device holder. The thermal device can include a first block having a high thermal conductivity, a second block having a high thermal conductivity, and a heat-pump device disposed to transfer thermal energy between the first block and the second block. Herein, high thermal conductivity refers to a thermal conductivity of greater than 0.5 W/cm·K. The heat-pump device can be disposed physically between or adjacent the first block and the second block. The heat-pump device can transfer thermal energy from at least one of the first block and the second block to the other of the first block and the second block. The fluid processing device holder can hold a fluid processing device in a heat-transfer position with respect to the first block and the second block.

According to various embodiments, a method is provided that can include providing a fluid processing device including at least one fluid processing pathway. Each fluid processing pathway can include at least a first fluid retainment region, a second fluid retainment region, and a fluid communication between the first fluid retainment region and the second fluid retainment region. The method can include providing a thermal device including a first block having a high thermal conductivity, a second block having a high thermal conductivity, and a heat-pump device disposed to transfer thermal energy between the first block and the second block. The method can include transferring thermal energy from at least one of the first block and the second block to the other of the first block and the second block, using the heat-pump device. At the same time, the fluid processing device can be held in a heat-transfer position wherein the first fluid retainment region can be in thermal contact with the first block and the second fluid retainment region can be in thermal contact with the second block. The fluid communication can be sealable, interruptible, closeable, openable, or the like.

Additional features and advantages of various embodiments will be set forth in part in the description that follows, and in part will be apparent from the description, or can be learned by practice of various embodiments. Other advantages of the various embodiments will be realized and attained by means of the elements and combinations particularly pointed out in the application.

BRIEF DESCRIPTION OF THE DRAWINGS

Various embodiments of the present teachings are exemplified in the accompanying drawings. The teachings are not limited to the embodiments depicted in the drawings, and include equivalent structures and methods as set forth in the following description and as would be known to those of ordinary skill in the art in view of the present teachings. In the drawings:

FIG. 6 is a bottom view of a fluid processing device positioned over a thermal device, according to various embodiments;

FIG. 7a is a front view of an exemplary system that can be used to process a fluid processing device;

FIG. 7b is an exploded view of the system shown in FIG. 7a, in partial phantom, with the top cover removed;

FIG. 7c is a side view of the device shown in FIG. 7a;

FIG. 7d is an exploded view in partial phantom of the device shown in FIG. 7c with the cover open;

FIG. 7e is an enlarged view of the assembly loading door of the system shown in FIG. 7a;

FIG. 7f is an enlarged view of a portion of the system shown in FIG. 7a, depicting the positions of the valve actuators, thermal devices, and electronics;

FIG. 7g is an enlarged view of a section of the system shown in FIG. 7a partially cutaway to show the two-assembly platen;

FIG. 7h is an enlarged view of a section of the system shown in FIG. 7a including an assembly loaded in the assembly-loading door;

FIG. 7i is an enlarged view of a section of the system shown in FIG. 7a, in partial cutaway to show two assemblies loaded for spinning while being held to the rotating platen; and FIG. 8 is an enlarged, perspective view of a fluid processing device according to various embodiments;

FIG. 9 is a perspective view of a fluid processing device according to various embodiments;

Figure 1:
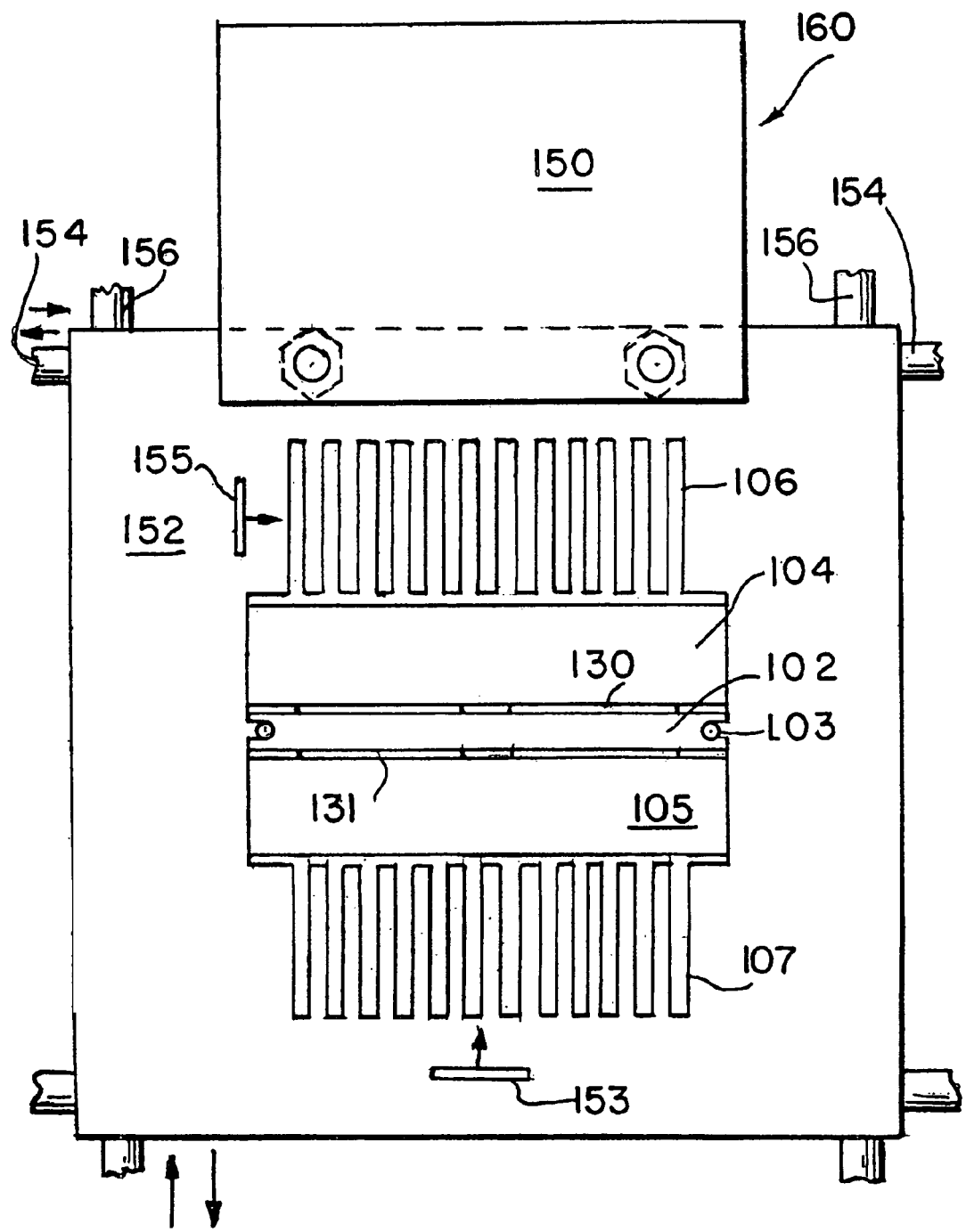
FIG. 1 is a top view of a thermal system according to various embodiments.

It is to be understood that both the foregoing general description and the following detailed description are exemplary and explanatory only and are intended to provide a further explanation of the various embodiments of the present teachings.

DESCRIPTION OF VARIOUS EMBODIMENTS

According to various embodiments, a system is provided that can include a thermal device and a fluid processing device holder. The thermal device can include a first block, a second block, and a heat-pump device disposed to transfer thermal energy between the first block and the second block. Herein, high thermal conductivity refers to a thermal conductivity of greater than 0.5 W/cm·K. The heat-pump device can be disposed physically between or adjacent the first block and the second block. The heat pump can be disposed at ends of, or end regions of, or otherwise adjacent both the first block and the second block. The heat-pump device can transfer thermal energy from at least one of the first block and the second block to the other of the first block and the second block. The fluid processing device holder can hold a fluid processing device in a heat-transfer position with respect to the first block and the second block.

Each of the first and second blocks can include a thermally conductive metal material, such as steel or aluminum.

According to various embodiments, the system can include a control device to control the heat-pump device to provide the first block with a temperature that is greater than the temperature of the second block. The control device can control the heat-pump device to transfer heat from the first block to the second block and to transfer heat from the second block to the first block. The control device can control the temperature of the first block to be at least, for example, about 15° C., about 30° C., or about 40° C., greater than the temperature of the second block. According to various embodiments, the control device can control the heat-pump device to heat the first block to about 95° C., and to keep the temperature of the second block to be less than about 50° C.

According to various embodiments, at least one of the first block and the second block can include a surface, and the thermal device can further include a thermal interface material disposed in contact with the surface. The first block can include a first heat-transfer surface and the second block can include a second heat-transfer surface, where the first heat-transfer surface and the second heat-transfer surface can be flush with and/or co-planar with one another. According to various embodiments, the heat transfer surfaces of the first block and the second block can be slightly offset from one another. For example, the heat transfer surface of the first block can be positioned relatively raised or offset as compared to the heat transfer surface of the second block. The heat transfer surfaces can lie on planes parallel to one another, but not co-planar. The offset position of the first block heat transfer surface can improve thermal contact between a fluid processing device and the first block heat transfer surface. The offset between the heat transfer surfaces of the first block and the second block can be, for example, from about 0.005 inch to about 0.1 inch, or from about 0.01 inch to 0.020 inches.

A thermal interface material including a flat surface can be disposed on the heat transfer surface of either or both of the first block and the second block. The thermal interface material can be compressible. In an uncompressed state, thermal interface material provided at the first block can provide a raised surface relative to the heat transfer surface of the first block. In operation, the thermal interface material can be compressed against a portion of a fluid processing device. The thermal interface material can be raised relative to the first block heat transfer surface by from about 0.05 inch to about 0.25 inch, in an uncompressed state. The heat transfer surface of the first block can be offset by about 0.015 inch compared to the heat transfer surface of the second block. When a 0.020 inch thick thermal interface material is disposed against the heat transfer surface of the second block, the raised surface of the thermal interface material can protrude about 0.005 inch or more as compared to the heat transfer surface of the first block. The thermal interface material can comprise a heat conductive material, for example, GAPPAD VO ULTRA SOFT available from Berquist Company, Chanhassen, Minn.

According to various embodiments, the system can include at least one heat sink in thermal contact with at least one of the first block and the second block. The heat sink can be a metal block with fins or other features providing a large surface area for thermal exchange with another thermal mass, for example, air. The system can include at least one fan adapted to create an air-current in thermal contact with at least one of the first block, the second block, and if a heat sink is included, the heat sink.

The system can include at least one temperature sensor in thermal contact with at least one of the first block and the second block. The system can include a pressing device adapted to force at least one of the first block and the second block into thermal contact with a fluid processing device when such a fluid processing device is held by the fluid processing device holder. The system can include an alignment device to operatively position the fluid processing device holder and the heat-pump device with respect to one another.

According to various embodiments, the system can include a platform and a second thermal device supported by the platform. The second thermal device can include a third block, a fourth block, and a second heat-pump device disposed between the third block and the fourth block. The second heat-pump device can transfer thermal energy from at least one of the third block and the fourth block to the other of the third block and the fourth block. The first block, the second block, the third block, and the fourth block can be disposed in respective heat-transfer positions. According to various embodiments, the first block, the second block, the third block, and the fourth block can be simultaneously disposed in respective heat-transfer positions.

According to various embodiments, the thermal device can include a third block and a second heat-pump device disposed between the first block and the third block, where the second heat-pump device can transfer thermal energy from at least one of the first block and the third block to the other of the first block and the third block. The system can include a control device that can control the heat-pump device to provide the first block with a temperature that can be greater than the temperature of the third block. The fluid processing device holder can hold a fluid processing, for example, a microfluidic card-type device.

According to various embodiments, the system can include a fluid processing device held by the fluid processing device holder. The fluid processing device can include at least one fluid processing pathway. Each fluid processing pathway can include at least a first fluid retainment region, a second fluid retainment region, and a fluid communication between the first fluid retainment region and the second fluid retainment region. The first fluid retainment region can be positioned in a heat-transfer position with respect to the first block of the system, and the second fluid retainment region can be positioned in a heat-transfer position with respect to the second block of the system. The system can include a fluid movement device, unit, or system, adapted to move or transfer a fluid from the first fluid retainment region to the second fluid retainment region via the fluid communication. The system can include a valve manipulation device supported by a common or a different platform, and the fluid processing device can include a valve between the first fluid retainment region and the second fluid retainment region. The at least one fluid processing pathway can include a plurality of fluid processing pathways each including a respective first fluid retainment region and a respective second fluid retainment region. The plurality of first fluid retainment regions can be aligned linearly with respect to each other. The plurality of first fluid retainment regions can be evenly or differently spaced from adjacent first fluid retainment regions. According to various embodiments, the second fluid retainment region can include a plurality of second fluid retainment regions aligned linearly with respect to each other, and evenly or differently spaced from one another.

According to various embodiments, a method is provided that can include manipulating a fluid processing device that includes at least one fluid processing pathway, wherein the pathway includes at least a first fluid retainment region, a second fluid retainment region, and a fluid communication between the first fluid retainment region and the second fluid retainment region. The method can include providing a thermal device. The thermal device can include a first block, a second block, and a heat-pump device in thermal contact with, for example, disposed between, the first block and the second block. The method can include transferring thermal energy from at least one of the first block and the second block to the other of the first block and the second block using the heat-pump device, and holding the fluid processing device in a heat-transfer position. The first fluid retainment region can be in thermal contact with the first block and the second fluid retainment region can be in thermal contact with the second block.

According to various embodiments, the method can include controlling the heat-pump device to provide the first block with a temperature that can be greater than the temperature of the second block. The controlling can include heating the first block to an elevated temperature, for example, to a temperature of about 95° C. The method can include maintaining the temperature of the second block to be less than the elevated temperature, for example, less than about 50° C. when the elevated temperature exceeds 50° C. The controlling can include achieving and maintaining the temperature of the first block to be at least about 40° C. greater than the temperature of the second block. The controlling can include inverting a direction of the thermal transfer with respect to the first block and the second block. The controlling can include controlling the heat-pump device to effect heat transfer from the first block to the second block and/or from the second block to the first block.

According to various embodiments, the method can include heating the first block with a heat-generating device. According to various embodiments, the method can include creating an air-current in thermal contact with at least one of the first block and the second block. According to various embodiments, the method can include cycling a temperature of the first block from a first temperature to a second temperature, and then back to the first temperature. According to various embodiments, the method can include forcing at least one of the first block and the second block into thermal contact with a fluid processing device. According to various embodiments, the method can include positioning the fluid processing device and the thermal device with respect to one another.

According to various embodiments, the method can include providing a second thermal device including a third block, a fourth block, and a second heat-pump device disposed to transfer heat between the third block and the fourth block. The second heat pump can be disposed physically between, at ends of or end regions of, or otherwise adjacent, the first block and the second block. The method can include transferring thermal energy from at least one of the third block and the fourth block to the other of the third block and the fourth block, and positioning the second thermal device such that or wherein the third block can be in a heat-transfer position with respect to the first fluid retainment region, and the fourth block can be in a heat-transfer position with respect to the second fluid retainment region.

According to various embodiments, the method can include providing the thermal device with a third block and a second heat-pump device disposed to transfer heat between the first block and the third block. The second heat-pump device can be adapted to transfer thermal energy from at least one of the first block and the third block to the other of the first block and the third block. The first block can be arranged or disposed, for example, between the second block and the third block.

According to various embodiments, the method can include loading a first set of materials reactive at a first minimum temperature into the first fluid retainment region and loading a second material into the second fluid retainment region. The second material can include a material that can be rendered substantially ineffective when subjected to the first minimum temperature. The first set of materials can include nucleic acid amplifying reagents. The nucleic acid amplifying reagents can include polymerase chain reaction reagents. The first set of materials can include oligonucleotide ligase reaction reagents. The second material can include size-exclusion ion-exchange media. The second material can include reagents capable of performing purification, for example, by filtering and/or by ion-exchange.

According to various embodiments, the method can include loading a target nucleic acid material and amplifying reagents into the first fluid retainment region and amplifying the nucleic acid material by thermal cycling in the first fluid retainment region. The method can include loading size-exclusion ion exchange media into the second fluid retainment region. The method can include loading reagents for a purification reaction into the second fluid retainment region, for example, ingredients for an ion-exchange reaction.

According to various embodiments, the temperature of a fluid retainment region in a fluid processing device can be controlled by a thermal cycler that includes a Peltier-effect thermoelectric device, a heat-pump, an electrical resistance heating element (Joule heater), fluid flow through channels in a metal block, reservoirs of fluid at different temperatures, a tempered air impingement device, or a combination thereof According to various embodiments, a plurality of blocks can be maintained at various temperatures to maintain different temperatures in different fluid retainment regions of a fluid processing device. The different temperatures can be maintained in a plurality of areas separated by imaginary lines drawn between a plurality of fluid retainment regions in a fluid processing device. According to various embodiments, a plurality of blocks can be aligned with the temperatures as desired. Thermal energy can be transferred between the blocks. Thermal energy can be transferred from the blocks to the fluid processing device.

According to various embodiments, cycling of a block temperature between various temperatures can effect quick changes in the temperature of a fluid retainment region. More than one heat pump can be disposed between the blocks to increase the heat pumping capacity of the system, allowing for faster cooling and/or heating of the blocks. After achieving a desired temperature for a block, a temperature sensor can be used to maintain the desired temperature of a fluid retainment region to be within about +/−5° C. of a desired temperature, for example, to be within about +/−1° C., or about +/−0.5° C. A computer system can be used to control the thermal system. A computer system can be used to maintain a desired temperature for a desired time period and for maintaining a desired number of cycles. Blocks can be placed adjacent one another, without contacting one another, to achieve and maintain the blocks at disparate temperatures. A thermal insulator can be placed between two adjacent blocks to help maintain the two blocks at different respective temperatures. A thermal insulator can be placed between two adjacent blocks to maintain the two blocks at the same temperature.

According to various embodiments, the system can include a thermal device in thermal contact with a fluid retainment region of a fluid processing device. The fluid retainment region can be included in a substrate, for example, a substrate including a first and second surface. The thermal device can be disposed along the first or the second surface, for example, above or below the fluid retainment region of the fluid processing device. Such a configuration of a thermal device is herein referred to as a single-sided thermal cycler.

According to various embodiments, the system can include two thermal devices aligned to regulate the temperature of a fluid retainment region, where one of the two thermal devices is disposed along a first surface of a fluid processing device and the other of the two thermal devices is disposed along an opposite, second surface of the fluid processing device. Such a configuration of thermal devices is referred to herein as a double-sided thermal cycler.

According to various embodiments, any of the blocks described above can be shaped as a disk, a cylinder, a cuboid, a rectanguloid, a bar, or as any other shape. In the accompanying drawings, and for the sake of simplicity, a rectanguloid block is depicted. A surface of the block can be designed to complement a region of a fluid processing device that is to be thermally regulated. Shapes of the blocks used herein can be altered to match a shape of a thermally regulated region of a fluid processing device. The shape of the block can include a flat surface to thermally contact a heat-transfer surface of a heat-pump, for example, a heat absorbing surface of a thermoelectric device.

With reference to the drawings, FIG. 1 is a top view of a thermal system 160. The thermal system 160 can include a carriage 152 that is capable of sliding along rails in a plurality of directions. The carriage 152 can be capable of latitudinal and/or longitudinal movements. Rails 154 and 156 can be included to provide guidance for the latitudinal and/or longitudinal movements. According to various embodiments, the carriage 152 can be permanently affixed, for example, to a base or platform, such as to base 150 as shown. A first block 102, can be configured as a relatively hot block, and can be thermally coupled to one or more thermoelectric device 130, 131. The thermoelectric device 130, 131 can be thermally coupled to a second block 104 and to a third block 105, that can be configured to be relatively cold blocks. One or more alignment pins 103 can be disposed at or near an end of the first block 102. The alignment pins 103 can align the first block 102 with a fluid retainment region such as a reaction well (not shown) formed in or on a fluid processing device (not shown). Heat sinks 106, 107, for example, each including a plurality of cooling fins, can be in thermal contact with the second block 104 and the third block 105. A fan 155 can be provided to create an air flow in the direction indicated to thus flow over and cool the heat sink 106. A fan 153 can be provided to create an air flow in the direction indicated to thus flow across and cool the heat sink 107. The thermoelectric device 130, 131 can be thermally coupled to and disposed between the first block 102 and the second block 104, as shown at 130, and between the first block 102 and the third block 105, as shown at 131. According to various embodiments, a plurality of thermoelectric devices like 130 and 131 can be thermally coupled to at least the first block 102.

Figure 2:
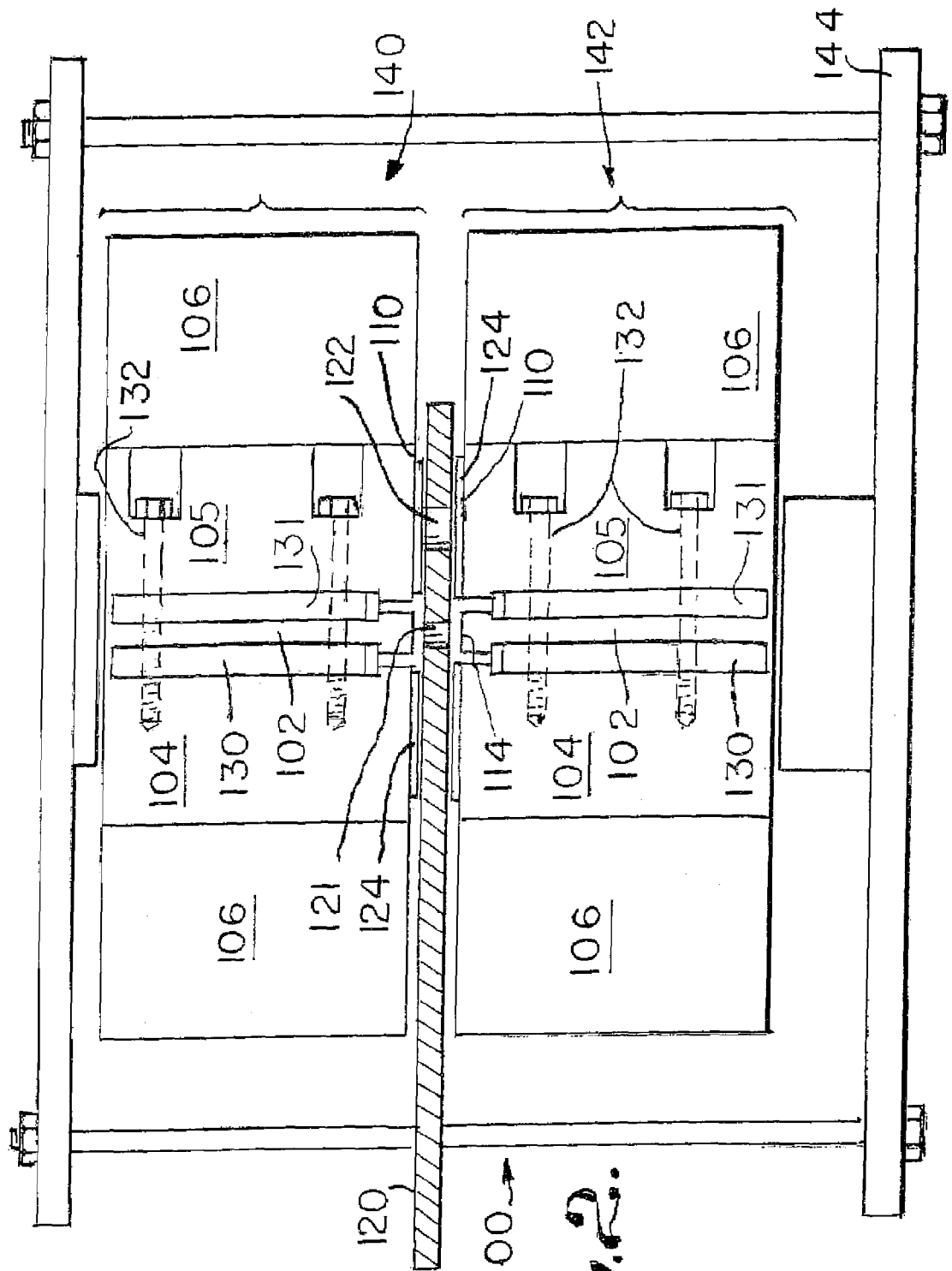
FIG. 2 is a side, partial cross-sectional view of a thermal system including a dual-sided thermal device, according to various embodiments.

FIG. 2 is a side, partial cross-sectional view of a thermal system 100 including two thermal devices 140 and 142, that together form a dual-sided thermal cycler. The two thermal devices 140, 142 can be made to be in thermal contact with a fluid processing device 120. Each thermal device 140, 142 respectively includes a first block 102, a thermoelectric device 130, a second block 104, a third block 105, and two heat sinks 106. Each thermal device 140, 142 can be assembled using articles known in the art, for example, bolts 132. Each second block 104 can include a thermal interface material 124. The thermal interface material 124 can be a compressible material. A second thermal interface material (not shown) can be disposed on the first block 102. The fluid processing device 120 can include a first fluid retainment region 121 and a second fluid retainment region 122. The first fluid retainment region 121 can be subjected to higher temperatures than the second fluid retainment region 122. The first block 102 can include a heat-transfer surface 114 that can be aligned into a heat-transfer position with respect to the first fluid retainment region 121 of the fluid processing device 120. The third block 105 can include a heat-transfer surface 110 that can be aligned into a heat-transfer position with respect to the second fluid retainment region 122. The heat transfer surface 114 can be co-planar or flush with the heat-transfer surface 110 The heat transfer surface 114 can be offset from the plane of the heat-transfer surface 110. The thermal interface material 124 can provide a heat-transfer surface that is co-planar with the heat-transfer surface 110. The fluid processing device 120 can be compressed between the thermal devices 140 and 142 using a pressing assembly 144. The pressing assembly 144 can include, for example, a clamping device, a set of bolts, a pneumatic press, a hydraulic press, or a multiplicity or combination thereof The pressing assembly 144 can include a device that is capable of moving either the fluid processing device 120 or the heat-transfer assembly, in relation to one another, and between a pressure-application position and a release position.

According to various embodiments, the thermal system can include two thermal devices, including a lower thermal device and an upper thermal device. The lower thermal device can include a hot block sandwiched between two thermoelectric devices and two cold blocks, each thermal device sandwiching a respective thermoelectric device between the respective cold block and the hot block. The upper thermal device can be identical to and/or a mirror image of, the lower thermal device. The upper thermal device can be disposed above the lower thermal device, as a mirror or as an inverted version of, the lower thermal device. According to various embodiments, during the heating portion of a thermal cycle, the thermoelectric devices, in both the upper and lower thermal devices, can transfer heat from the upper and lower flanking cold blocks to the respective upper and lower hot blocks. According to various embodiments, during the cooling portion of the thermal cycle, the direction of the heat transfer by the upper and lower thermoelectric devices can be reversed, and the upper and lower thermoelectric devices can transfer heat from the upper and lower hot blocks to the respective upper and lower flanking cold blocks.

According to various embodiments, a fluid processing device including at least one plurality of linearly aligned fluid retainment regions can be positioned between the upper and lower thermal devices whereby the plurality of linearly aligned fluid retainment regions can be disposed centered on the hot block of at least one of the upper and lower thermal devices. A fluid retainment region in the at least one plurality of linearly aligned reaction reactions can be used for, for example, a nucleotide amplification reaction, a nucleotide sequencing reaction, an oligonucleotide synthesis reaction, or the like. According to various embodiments, the hot blocks of the upper and lower assemblies can clamp the fluid processing device therebetween. According to various embodiments, the cold blocks of the upper and lower assemblies can clamp the fluid processing device therebetween. According to various embodiments, the pressing device can include the lower thermal device and the upper thermal device to press against the fluid processing device during operation. The pressing device and the two thermal devices can operate at the same time or at different start and/or stop times.

According to various embodiments, the heat capacity (Joules/Kelvin) of the cold blocks can be larger than the heat capacity of the hot blocks, for example, about 5-times, about 10-times, or about 50-times. The cold blocks can use the surrounding environment, for example, air, as a heat source or as a heat sink depending on the direction of heat-transfer by the thermoelectric device, by using heat sinks thermally coupled to the cold blocks. The control device can control the temperature of the hot block to be at least about 10° C., at least about 15° C., at least about 20° C., at least about 30° C., at least about 40° C., or at least about 50° C., greater than the temperature of the cold block.

According to various embodiments, the terms "cold block" and "hot block" exemplify the relative temperatures of the blocks relative to one another. The cold block can be hotter than the ambient environment. The hot block can be cooler than the ambient environment. In operation, the hot block can be hotter than the cold block. This can occur, for example, when the hot block is heated to a temperature of about 95° C. and the cold block is heated to a temperature of only about 50° C. or less. In operation, the hot block can be cooler than the cold block. This can occur, for example, when after completion of a heating cycle the hot block is cooled to a temperature of about 25° C. while the cold block maintains or reduces to a temperature of above about 25° C.

According to various embodiments, each thermal device can include a fan to direct air-flow over heat sinks and/or a cold block to assist in a heat transfer between blocks. According to various embodiments, the thermal conductivity of a fluid processing device can be less than the thermal conductivity of a block. According to various embodiments, the thermal conductivity of the block can be greater than the thermal conductivity of an ambient environment, for example, air at about one atmosphere of pressure at about 300° K.

The thermal conductivity of a material is equivalent to the quantity of heat that passes in a unit time through a unit area of a plate, when the material's opposite faces are subject to a unit temperature gradient, such as, a one degree temperature difference across a thickness of one unit. Thermal conduction is the transfer of heat or thermal energy from one substance to another.

According to various embodiments, the block or bar can include a material having a high thermal conductivity, for example, diamond or metal, for example, aluminum, copper, steel, stainless steel, alloys or combinations thereof. At temperatures of about 273° K to about 300° K various materials having a typical thermal conductivity of at least about 0.5 Watts per centimeter Kelvin (W/cm·K), for example, at least about 1.9 W/cm·K, or at least about 5 W/cm·K, can be used to form a block. According to various embodiments, a block can be a high thermal conductivity block when the block has a thermal conductivity of at least about 0.5 W/cm·K, for example, at least about 1.9 W/cm·K, or at least about 5 W/cm·K. at temperatures of about 273° K to about 300° K.

According to various embodiments, a heat-pump can be a machine, that moves heat from a low level of temperature to a higher level of temperature under supply of work, for example, gas compression heat-pumps, phase change heat-pumps, or thermoelectric heat-pumps that use the Peltier effect. A heat-pump can include a vapor-cycle device, for example, a Freon-based vapor compression or absorption refrigerator. Vapor-cycle devices can include moving mechanical parts and require a working fluid, while thermoelectric elements can be totally solid state.

According to various embodiments, a thermoelectric device can be used as a heat-pump, for example, an XLT module available from Marlow Industries, Inc. of Dallas, Tex. Controls for a thermoelectric device can include an adjustable-bipolar DC output current power supply. The power supply can provide programmable PID control/ramp set points to control the thermoelectric device, deviation alarms, and automatic and manual operating modes. In reactions, for example, a Polymerase Chain Reaction (PCR), thermoelectric devices can both heat and cool fluid retainment regions at a predetermined rate by using a bi-directional power supply under computer control. Thermoelectric devices can be specifically designed to withstand the continuous temperature excursions required in PCR use.

According to various embodiments, a thermoelectric device can include a heat absorbing surface. The thermoelectric device can include a heat dissipating surface. The heat absorbing surface (cooling surface) can be in thermal contact with a cool block. The heat dissipating surface (heating surface) can be in thermal contact with a hot block. A control device can reverse the polarity of a voltage being applied to the thermoelectric device to reverse a direction of the heat flow effectively swapping the heat absorbing surface with the heat dissipation surface. When power is supplied to a thermoelectric device, the heat absorbing surface and the heat dissipating surface are activated, and each surface can be referred to as an active surface.

According to various embodiments, a thermal interface material (TIM) can provide a good thermal contact between two surfaces. The TIM can include silicone-based greases, elastomeric pads, thermally conductive tapes, thermally conductive adhesives, or a combination thereof Zinc-oxide silicone can be a common TIM. An elastomeric pad compressible to about 90% of an uncompressed thickness under an exerted pressure of at least 0.5 pounds per square inch (PSI), for example, at least about one (1) PSI, at least about five (5) PSI. According to various embodiments, Gap-Pad products, for example, the GAP PAD VO ULTRA SOFT available from Berquist Company of Chanhassen, Minn. can be used as a thermal interface material. A TIM is described in U.S. Pat. No. 5,679,457 to Bergerson, which is incorporated herein in its entirety.

According to various embodiments, a thermal connect, a thermal contact, or a thermal conduct can be a physical contact of two objects, for example, a fluid processing device surface with a block surface. According to various embodiments, a TIM can be disposed between the fluid processing device surface and the block surface, on the fluid processing device surface, or on the block surface to optimize the thermal contact. According to various embodiments, the block surface can be pressed against the fluid processing device surface to optimize the thermal contact.

According to various embodiments, a thermal insulator can provide low thermal conductivity. A thermal insulator can be used to prevent heat transfer from a temperature regulated volume to a temperature unregulated volume, for example, a thermal insulator can be used to prevent heat transfer from a heated volume to a cooled or unregulated volume. A thermal insulator can include wood, plastics, air, or gases. According to various embodiments, a thermal insulator can be disposed between or adjacent a heated fluid retainment region in a fluid processing device, and the fluid processing device holder or platen holding the fluid processing device.

According to various embodiments, a pressing device surface can exert a pressure against a first or operative surface of a fluid processing device. The pressing device surface can be provided by a thermal device. According to various embodiments, the pressing device surface can press the fluid processing device across different imaginary zones or regions of the fluid processing device. The pressing device surface can apply a compression force of, for example, from about one (1) lbs to 500 lbs, about 10 lbs, about 20 lbs, about 50 lbs, about 100 lbs, or about 200 lbs. The average force over the thermal cycled area can be approximately 20 lbs per square inch. Pressure exerted over a fluid retainment region can prevent leakage of a fluid retained in the fluid retainment regions. A single-sided thermal device can press against the fluid processing device. A dual-sided thermal device can press against the fluid processing device. A fluid processing device holder or platen can press against the fluid processing device.

According to various embodiments, a fluid processing device can move relative to a thermal device by shifting the fluid processing device, shifting the thermal device, or shifting both the fluid processing device and the thermal device. The shifting can be performed by placing either the fluid processing device or the thermal device on a movable fluid processing device holder. The fluid processing device holder can be included or disposed in a carriage. The fluid processing device holder can be movable by a robotic arm, other devices well known in the art, or the fluid processing device can be manually transferred. The fluid processing device holder can move along a single-axis, two-axes, or all three-axes. According to various embodiments, the fluid processing device and/or the thermal device can move to heat or cool a plurality of fluid retainment regions formed in or on a fluid processing device as desired. According to various embodiments, a platen can be spun to align a desired fluid retainment region with a heat-transfer position with respect to a thermal device. According to various embodiments, the fluid processing device holder can be used to force the fluid processing device and/or the thermal device against one another to provide a pressing force. According to various embodiments, the fluid processing device holder can be moved to allow another system, for example, a valve manipulation system, a fluid depositing system, an output retrieval system, a fluid movement system, a detection system, or a combination thereof, to access the fluid processing device.

According to various embodiments, an alignment system can generate a signal upon detecting a fluid processing device in a heat-transfer position. A control system can begin a thermal cycle based on the signal. The signal can be generated by using, for example, optical alignment, mechanical alignment, electrical alignment, manual alignment, or an on/off switch. According to various embodiments, alignment pins included in the thermal device can be solenoids. According to various embodiments, the alignment system can indicate an error in the fluid processing device placement by generating an error signal, for example, by beeping, by lighting an error light, or by indicating an alignment error on a computer screen.

According to various embodiments, a fluid processing device can include an alignment device, for example, a hole, a notch, a pin, a chamfered edge, a chamfered corner, or combinations thereof The alignment device can assist in the correct placement of the fluid processing device in the fluid processing device holder. According to various embodiments, a fluid processing device holder can include an alignment device, for example, a hole, a notch, a pin, a chamfered edge, a chamfered corner, for correct operative alignment of the fluid processing device holder with respect to a thermal device. A plurality of exemplary alignment devices can be disposed in or on the fluid processing device and/or the fluid processing device holder. For example, two alignment pins in the fluid processing device holder can align a fluid processing device into a heat transfer position wherein the fluid device can include two holes or notches.

According to various embodiments, a thermal device can supplement heat from one or more thermoelectric devices by using a heat generating device, for example, a heat resistive wire. The heat generating device can be eliminated to reduce cost. According to various embodiments, a temperature sensor can include, for example, a thermometer, a thermistor, or a thermocouple sensor.

According to various embodiments, a region of the fluid processing device holder operatively in a good or high thermal contact with a fluid retainment region can include a heating element, for example, a thin-resistive heater. During a thermal cycling protocol, the heating element can raise and maintain the temperature of the reaction region at a fixed or uniform temperature, for example, about 40° C., about 50° C., or about 55° C., while the thermal device can be used to oscillate the temperature of the reaction region from about 60° C. to about 95° C. The heating element can reduce the thermal gradient of the fluid processing device. This reduction in the thermal gradient due to the use of a heating element can be greater than a reduction in the thermal gradient when a thermal insulator is operatively disposed in good or high thermal contact with the fluid retainment region. The heating element can be used in conjunction with a thermal insulator. The heating element can have a low mass. The heating element can have a long lifetime. The heating element can be of durable construction.

According to various embodiments, a thermal device can provide one or more thermoelectric devices that can transfer heat between two blocks. According to various embodiments, one, two, or more thermal devices can surround a fluid processing device. According to various embodiments, a thermal system can provide one, two, or more thermal assemblies, wherein a thermal assembly is one or more thermal devices configured to operate cooperatively on a fluid processing device disposed in a fluid processing device holder. The thermal assemblies in a thermal system can correspond to the number of fluid processing device holders in a thermal system. The dual-sided thermal system described above is an example of a thermal assembly including two thermal devices.

According to various embodiments, a thermal cycling system using a single-sided thermal device can reduce the mechanical complexity of the thermal cycling and platen sub-assemblies. The single-sided thermal device can lead to a fluid processing device holder or platen design that can be more aerodynamic and structurally sound.

Figure 3:
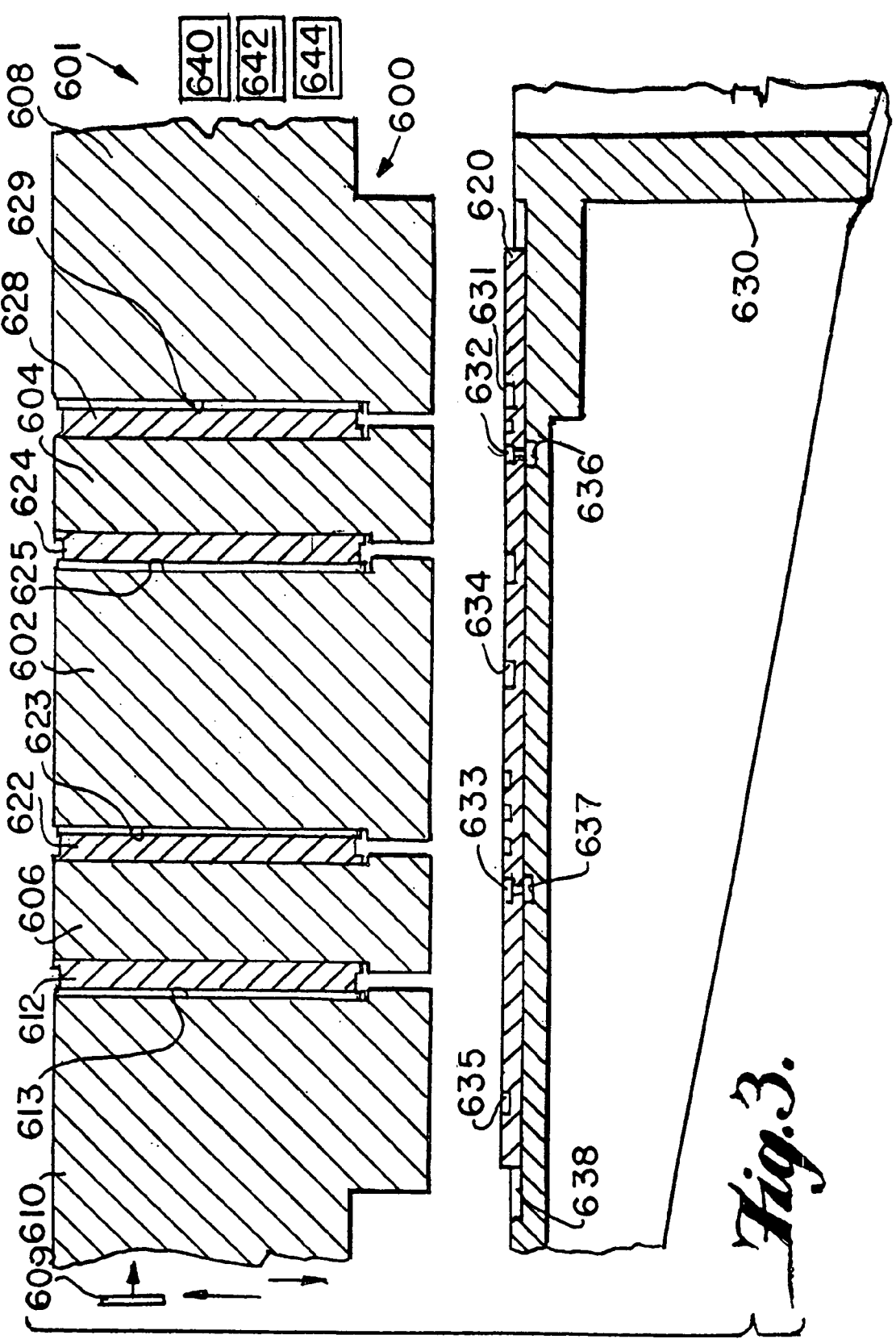
FIG. 3 is an cross-sectional view a thermal system including a single-sided thermal device, a fluid processing device, and a platen, according to various embodiments.

FIG. 3 a side partial cross-section of a thermal system 601 including a thermal device 600 and a platen 630. The thermal device 600 can include a plurality of thermoelectric devices 612, 622, 624, 628. The plurality of thermoelectric devices 612, 622, 624, 628 can be thermally coupled to a fluid processing device 620. The thermal device 600 can include a first block 610. The first block 610 can be used to thermally regulate a fluid retainment region 635 of the fluid processing device 620. The first block 610 can be a cold block. A cooling fan 609 can direct an air flow across the first block 610. The thermoelectric device 612 can include a heat absorbing surface 613 in contact with the first block 610, and can be disposed adjacent or between the first block 610 and a second block 606. The second block 606 can be used to thermally regulate a fluid retainment region 633 of the fluid processing device 620. The second block 606 can be a hot block. The thermoelectric device 622 can include a heat absorbing surface 623 in contact with a third block 602, and can be disposed adjacent or between the second block 606 and the third block 602. The third block 602 can be used to thermally regulate a fluid retainment region 634 of the fluid processing device 620. The third block 602 can be a cold block. A cooling fan (not shown) can be disposed to direct an air flow across the third block 602. The thermoelectric device 624 can include a heat absorbing surface 625 in contact with the third block 602, and can be disposed adjacent or between the third block 602 and a fourth block 604. The fourth block 604 can be used to thermally regulate a fluid retainment region 632 of the fluid processing device 620. The fourth block 604 can be a hot block. The thermoelectric device 628 can include a heat absorbing surface 629 in contact with a fifth block 608, and can be disposed adjacent or between the fourth block 604 and the fifth block 608. The fifth block 602 can be used to thermally regulate a fluid retainment region 631 of the fluid processing device 620. The third block 602 can be a cold block.

The fluid processing device 620 can be a microfluidic device, for example, the microfluidic device 500 as illustrated in FIG. 8, or the microfluidic device 800 of FIG. 9. The fluid processing device 620 can be placed in a fluid processing device holder 638 that is disposed in the platen 630. The fluid processing device holder 638 can be a recess in the platen 630. The fluid processing device 620 can be secured in, on, or to the fluid processing device holder 638 using locks tabs, adhesive, tape, friction, or other devices well known in the art. Fluid retainment regions 632, 633 can be subjected to higher temperatures than fluid retainment regions 631, 634, 635. The fluid processing device holder can include a channel 636, 637. The channel 636, 637 can complement and align with a shape of a desired fluid retainment region. The channel 636, 637 can have a thermal insulator disposed therein. The platen 630 can be rotatable.

The channel 636, 637 can include a heating element (not shown) disposed therein. In operation, a control unit 640 can use the heating element included in the channel 636, 637 to add heat to the fluid processing device 620. The added heat can regulate the temperature of fluids contained in fluid retainment regions 632, 633.

The control unit 640 can transfer heat from blocks 602, 608, 610 to blocks 604, 606 using thermoelectric devices 612, 622, 624, 628. The control unit 640 can reverse a polarity of a voltage supplied to the thermoelectric devices 612, 622, 624, 628 to reverse a direction of the thermal energy transfer, i.e., to transfer heat from blocks 604, 606 to blocks 602, 608, 610. The control unit 640 can use a signal from a temperature probe 644. The temperature probe 644 can be a plurality of temperature probes. The temperature probe 644 can include one or more temperature probes measuring temperatures across a block, for example, blocks 602, 604, 606, 608, 610. The control unit 640 can independently operate thermoelectric devices 612, 622, 624, 628. The control unit 640 can control a movement of the thermal device 600 to place the thermal device 600 in thermal contact with the fluid processing device 620, for example, between a pressure application position and a pressure release position. Arrows in FIG. 3 illustrate possible directions of movement for the thermal device 600. The control unit 640 can control a pressing device 642 to press the thermal device 600 against the fluid processing device 620.

According to various embodiments, a system can include a plurality of thermal devices to regulate temperatures of a plurality of fluid retainment regions. The plurality of fluid retainment regions can be disposed in one substrate. The plurality of fluid retainment regions can be disposed in a plurality of substrates.

According to various embodiments, the thermal device, single-sided or dual-sided, can be very effective in performing many types of chemical reactions requiring various thermal protocols. According to various embodiments, the thermal device can be used for a plurality of reactions: amplification reactions, for example, PCR or Oligonucleotide Ligation Assay (OLA); labeling reactions, for example, sequencing and SnaPshot; or enzymatic purifications, for example, by using ExoI, EXO-SAP-IT, or Lambda-Exo nuclease (Lambda-Exo). ExoI or ExoInuclease I, and Lambda-Exonuclease are available from New England Biolabs of Beverly, Mass. (see www.neb.com). EXO-SAP-IT is a registered trademark of and available from USB Corporation of Cleveland, Ohio (see www.usbweb.com). SnaPshot is a trademark of and available from Applied Biosystems of Foster City, Calif. (see www.apppliedsytems.com). The chemical reactions can be completed in microfluidic devices. The chemical reactions can utilize a dual sided vertical Peltier thermal cycler.

According to various embodiments, a fluid retainment region can be pre-loaded with a reagent. The pre-loaded reagents can be, for example, dried-down probes, primers, tags, labels, reactants, buffers, or other reagents useful in nucleic acid sequence amplification, sequencing, ligation, or the like, reactions as known to those of ordinary skill in the art. Examples of reagents that can be used and/or preloaded include: for example, reducing agents (e.g. dithiothreitol, tris[2-carboxyethyl]phosphine hydrochloride), alkylating agents (e.g. iodoacetic acid, iodoacetamide), derivatization reagents (e.g. N-hydroxysuccinamide activated biotin, sulfo-succinimidyl-4-O-[4,4'-dimethoxytrityl] butyrate, 2-iminothiolane hydrochloride, fluorescein isothiocyanate), cross-linking reagents (e.g. dimethyl pimelimidate hydrochloride, disuccinimidyl suberate, 1-ethyl-3-[3-dimethylaminopropyl]-carbodiimide hydrochloride), lyophilized enzymes (e.g. trypsin, chymotrypsin, pepsin, papain), immobilized enzymes (e.g. immobilized trypsin), catalysts, enzyme inhibitors, enzyme substrates, dyes, immobilized reagents, or combinations thereof.

According to various embodiments, the system can include one or more fluid processing device holders, each fluid processing device holder adapted to support a fluid processing device including a reaction region. A system can include a plurality of fluid processing device holders, for example, one, two, four, six, or six or more. The system can include a plurality of thermal devices, for example, one, two, four, six, or six or more. The system can include thermal devices equal in number to the number of fluid processing device holders included in the system. The system can include thermal devices less in number than the number of fluid processing device holders included in the system. The plurality of fluid processing devices disposed in the one or more fluid processing device holders can be thermally regulated by the system in a desired order.

According to various embodiments, the system can include a platen to support a fluid processing device. The platen can be divided into platen regions, for example, two, four, six, eight, or eight or more. Each platen region can include a fluid processing device holder. The platen regions can be geometric or non-geometric divisions of a plane. The platen can include a first surface. Fluid processing device holders and fluid processing devices therein can be distributed evenly or irregularly in the plurality of platen regions.

According to various embodiments, the platen can limit thermal variation through the thickness of the microfluidic device. A portion of the platen region can thermally contact the reaction region of the fluid processing device. The reaction region can be in thermal contact with a hot region of the thermal device. The portion of the platen region in thermal contact with the reaction region can include a thermal insulator, for example, black-glass-filled polycarbonate, plastics, air, a polyamide blanket, or gas. The thermal insulator can be moveably disposed in thermal contact with the reaction region. The thermal insulator, a material or material composition with poor thermal conductivity, can be included in the platen region, for example, in a groove in the platen, a circular groove in the platen, a groove complementing the form of a reaction region, or a groove complementing an surface area of a plurality of reaction regions on a fluid processing device. The thermal insulator could be included in the platen such that pockets of air are disposed in thermal contact with the reaction region.

Figure 4:
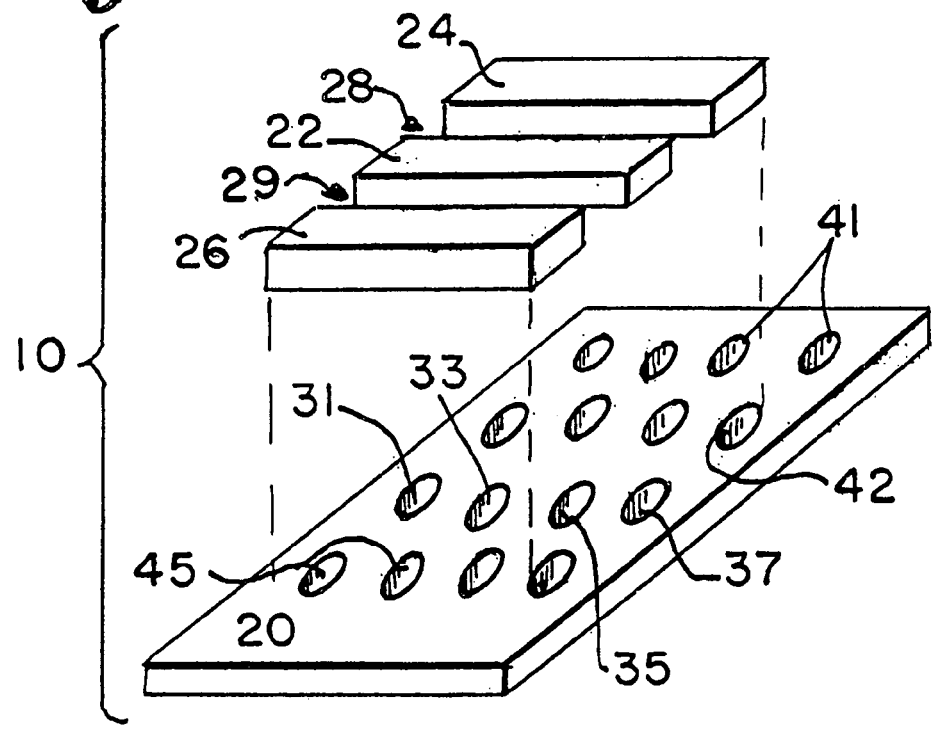
FIG. 4 is a perspective view of a plurality of blocks positioned with respect to a plurality of linearly-aligned fluid retainment regions of a fluid processing device, according to various embodiments.

FIG. 4 is a perspective schematic 10 of a plurality of blocks positioned with respect to a plurality of linearly-aligned fluid retainment regions. A first block 24 can be in thermal contact with a plurality of fluid retainment regions 42, for example, aligned in a linear fashion. A first gap 28 can be disposed between the first block 24 and a second block 22. The second block 22 can be disposed to conduct thermal energy to/from a plurality of fluid retainment regions 31, 33, 35, 37. A second gap 29 can be disposed between the second block 22 and a third block 26. The third block 26 can be disposed to conduct thermal energy to/from a plurality of fluid retainment regions 45, for example, aligned in a linear fashion. The fluid retainment regions can be formed in or on a fluid processing device 20. Non-thermally regulated fluid retainment regions 41 can also be disposed in the fluid processing device 20. Thermoelectric devices (not shown) can be disposed in the first gap 28 and/or the second gap 29. A control device (not shown) can control the thermoelectric devices to achieve and maintain various temperatures for the first, second and third blocks 24, 22, 26. The blocks can in turn achieve and maintain various temperature zones, zones formed by imaginary lines sectioning the fluid processing device 20, and the wells contained in the temperature zones. According to various embodiments, the control device can transfer heat among the first block 24, the second block 22, and the third block 26, with the second block 22 acting as an intermediate temperature zone.

Figure 5:
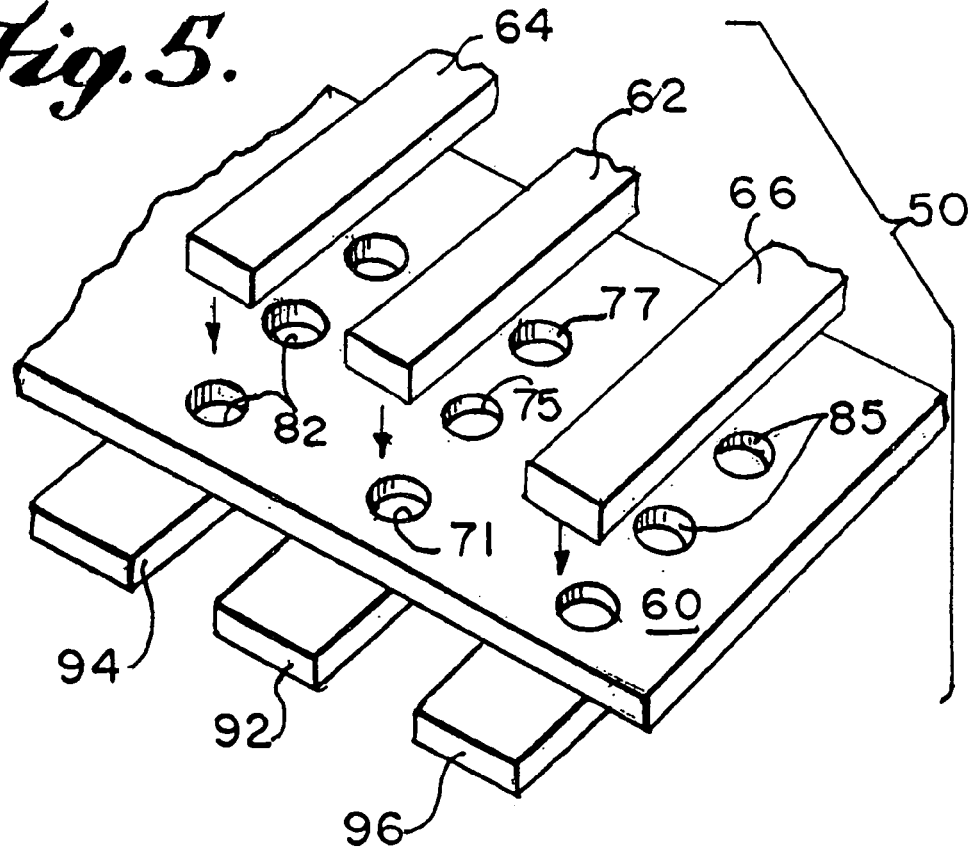
FIG. 5 is a perspective view of a plurality of blocks positioned with respect to a plurality of linearly-aligned fluid retainment regions of a fluid processing device, according to various embodiments.

FIG. 5 is a perspective schematic 50 of a plurality of blocks positioned with respect to a plurality of linearly-aligned fluid retainment regions. A first block 64 can be in thermal contact with a plurality of fluid retainment regions 82. A second block 62 can be disposed to conduct thermal energy to/from a plurality of fluid retainment regions 71, 75, 77. A third block 66 can be disposed to conduct thermal energy to/from a plurality of fluid retainment regions 85. The fluid retainment regions can be formed in or on a fluid processing device 60. The blocks can bring various regions or sections of the fluid processing device 50 to different temperatures, and maintain the regions at those temperatures. Non-thermally regulated blocks 92, 94, 96 can assist in cooling and/or heating of respective fluid retainment region in thermal contact with the first block 64, the second block 62, and the third block 66. Each non-thermally regulated block 92, 94, 96 can include a high conductivity material, for example, if the fluid retainment region in thermal contact with the non-thermally regulated block 92, 94, 96 is to be kept cooler than an adjacent fluid retainment region. Each non-thermally regulated block 92, 94, 96 can complement the functionality of the opposing first block 64, second block 62, and third block 66, respectively. For example, if the first block 64 and the third block 66 are to be used as cold blocks, the non-thermally regulated blocks 94, 96 can include a low conductivity material or a thermal insulator when, for example, the fluid retainment region in thermal contact with the non-thermally regulated block 94, 96 is to be kept warmer or hotter than an adjacent fluid retainment region. One or more cooling fans (not shown) can be disposed to create an air flow in thermal contact with the non-thermally regulated blocks 94, 96. The non-thermally regulated block 92 can be disposed opposite a hot block (second block 62), and can include a thermal insulator such as plastic.

Each non-thermally regulated block 92, 94, 96 can reduce a thermal load on a heat-pump or a heating element. The non-thermally regulated block 92, 94, 96 can be integrally formed by using a single-piece of thermal insulation to control the thermal load. The single-piece of thermal insulation can include a thermal insulation pad, for example, a polyamide blanket. According to various embodiments, the control device can use the thermoelectric devices to transfer heat among the first block 64, the second block 62, and the third block 66, with the second block 62 acting as an intermediate temperature zone.

FIG. 6 depicts a fluid processing device 566 thermally coupled with a thermal device 550 including a first cold block 552 and a second cold block 556 arranged around a hot block 554. A first thermoelectric device 557 can be disposed between the cold block 552 and the hot block 554. A second thermoelectric device 559 can be disposed between the cold block 556 and the hot block 554. The fluid processing device 566 can be aligned with the thermal device 550 by disposing an alignment pin 560 in an alignment notch 562. The alignment notch 562 can be included in the fluid processing device 566. A fluid retainment region 570 can be thermally coupled to the hot block 554, while fluid retainment regions 568, 572 can be thermally coupled to the first cold block 552 and the second cold block 556, respectively. Fluid retainment region 574 is not thermally regulated. A fluid input manifold 551 can distribute a fluid and/or reagents to the fluid retainment region 568. A second alignment notch 564 can be disposed in the fluid processing device 566. According to various embodiments, the fluid processing device 566 can be thermally coupled with the thermal device 550. By disposing the pin 560 in the second alignment notch 564, the fluid retainment region 572 can be thermally coupled with the cold block 552 and the fluid retainment region 574 can be thermally coupled with the hot block 554. An alignment pin 558 can be disposed in a separate alignment notch (not shown) in the fluid processing device 566.

FIGS. 7a through 7i depict a system according to various embodiments. The system 410 includes an electronics unit 412, a rotating platen 414, a thermal assembly 416, a cover 418, and an enclosure basin 420. The device 410 also includes an assembly processing unit 370 shown in FIGS. 7e-7h.

The assembly processing component 370 includes a tray loading door 372, electronics 412, a valve actuator 376, and two thermal assemblies 377 and 378. Each thermal assembly 377, 378 can include two thermal devices. Each thermal device can include a hot block and at least one cold block. The component 370 shown particularly in FIG. 7g includes a two-assembly platen 380 for processing two assemblies simultaneously. The non-labelled arrows shown in FIG. 7i depict the direction of centripetal force applied to the assembly resulting from rotation of the platen 380 about a central axis 386 thereof FIG. 7h shows tray loading door 372 in an open position and an assembly 381 loaded in the door and ready to be supported by the two-assembly platen 380 upon closure of the loading door 372.

FIG. 8 is an enlarged, perspective view of a microfluidic device 500 according to various embodiments that can be used to manipulate fluids, for example, micro-sized fluid samples. The microfluidic device 500 can include a substrate 510 that can include a plurality of fluid-containment features or fluid retainment regions formed therein or thereon, for example, a plurality of fluid retainment regions 514, 516, 518, 520, 522, 524. The fluid retainment regions 514, 516, 518, 520, 522, 524 can be formed in or on the microfluidic device 500. Other fluid-containment features, for example, reservoirs, recesses, channels, vias, appendices, input wells and ports, output wells, purification columns, or valves, can be interconnected by deformable valves, and can be included in or on the microfluidic device 500. According to various embodiments, a deformable valve 536, for example, a Zbig valve, can be arranged between the fluid retainment regions 514, 516, 518, 520, 522, 524 to selectively control fluid communication between the fluid retainment regions 514, 516, 518, 520, 522, 524. The deformable valve as described in U.S. patent application Ser. No. 10/808,228, filed Mar. 24, 2004, which is incorporated herein in its entirety by reference.

According to various embodiments, the substrate 510 of the microfluidic device 500 can be at least partially formed of a deformable material, for example, an inelastically deformable material. The substrate 510 can include a single layer of material, a coated layer of material, a multi-layered material, or a combination thereof The substrate 510 can be formed as a single layer and made of a non-brittle plastic material, for example, polycarbonate, for example, a TOPAS material, a plastic cyclic olefin copolymer material available from Ticona (Celanese AG), Summit, N.J. USA. The thermal conductivity of the TOPAS cyclic olefin copolymer can be about 0.16 Watt per meter Kelvin. The substrate 510 can be in the shape of a disk, a rectangle, a square, or any other shape. The substrate 510 can provide an operative surface for a thermal device to thermally contact the microfluidic device 500.

According to various embodiments, an elastically deformable cover sheet 508 can be adhered to at least one of the surfaces of the substrate 510. The cover sheet 508 can be made of, for example, a plastic, elastomeric, or other elastically deformable material. The microfluidic device 500 can include a central axis of rotation 534. The cover sheet 508 can provide an operative surface for a thermal device to thermally contact the microfluidic device 500. An input fluid-containment feature 530 can be fluidly connected to a manifold 532 for the introduction of one or more fluids to the fluid processing pathway 512 via a branch channel (not shown) or opening a valve (not shown). For example, one or more fluids can be introduced by piercing through the cover sheet 508 in the area of the input fluid-containment feature 530 and injecting one or more fluids into the input fluid-containment feature 530.

The fluid can be collected in output fluid retainment regions 526, 528 after being processed through the fluid processing pathway 512. According to various embodiments, the fluid processing pathway 512 can be arranged generally linearly. According to various embodiments, and as shown in FIG. 8 and FIG. 9, more than one fluid processing pathway 512 can be arranged side-by-side in or on the substrate 510. A plurality of samples or a plurality of reactions on the same sample can be processed in the fluid processing pathway 512. The processing can be serial or simultaneous. For example, 12, 24, 48, 96, 192, or 384 of the fluid processing pathways 512 can be arranged side-by-side to form a set of fluid processing pathways on a single microfluidic device 500. Moreover, two or more sets of fluid processing pathways can be arranged on a single microfluidic device 500. One or more output fluid retainment regions 526, 528 can be provided for each fluid processing pathway 512.

According to various embodiments, the microfluidic device 500 can be rotated through a central axis of rotation 534, to selectively force fluids between the fluid retainment regions 514, 516, 518, 520, 522, 524 of the microfluidic device 500, by way of applying a centripetal force. For example, by spinning the microfluidic device 500 around the central axis of rotation 534, a fluid can be selectively forced to move from at least the input fluid-containment feature 530 to the output fluid retainment regions 526, 528 along the fluid processing pathway 512. The fluid flow can be controlled by manipulation of valves 536. According to various embodiments, a platen 502, or a microfluidic device holder built-in the platen 502, can be arranged to support and rotate the microfluidic device 500 about the axis of rotation 534 of the platen and/or holder 502. According to various embodiments and as shown in FIG. 8, the axis of rotation of the platen 502 can be coaxial with the central axis of rotation 534 of the microfluidic device 500. An alignment notch 504 can be disposed in the microfluid processing device 500 to complement an alignment pin 506 in the platen 502.

According to various embodiments, the ability to achieve disparate temperature zones in nearly abutting fluid retainment regions can allow adjacent fluid retainment regions of a fluid processing device to be loaded with reagents activated at disparate temperatures. Alternatively or additionally, temperature sensitive reagents can be disposed in a fluid retainment region while an adjacent fluid retainment region can be subjected to temperatures that would render the temperature sensitive reagents inoperative. According to various embodiments, the temperature sensitive reagents can maintain their effectiveness, even as the adjacent fluid retainment region is subjected to temperatures incompatible with the temperature sensitive reagents. Temperature sensitive reagents can be reagents that can lose their effectiveness or be rendered inoperable if subjected to a temperature above a lower limit. According to various embodiments, a fluid retainment region and an adjacent temperature sensitive reagent region can be disposed nearly abutting on a fluid processing device, for example, separated by from about 1 mm to about 50 mm, separated by about 10 mm, separated by about 3 mm, or separated by about 2 mm.

According to various embodiments, the fluid movement device can provide for movement of fluids within features of a fluid processing device by, for example, spinning, suctioning, or pneumatics.

According to various embodiments, the valve manipulation device can comprise, for example, a deformer, a flap, or a solenoid. Further information about valve manipulation devices can be found in U.S. patent application Ser. No. 10/808,229 filed Mar. 24, 2004, which is incorporated herein in its entirety.

According to various embodiments, FIG. 9 is a top view of an exemplary microfluidic device 800 having two input ports 801, 802 for distributing a fluid sample to respective flow distributors 804, 806, each flow distributor being in fluid communication with, or being designed to be in interruptible communication with a pathway 803. The microfluidic device 800 can include 384 output ports 808. Each pathway 803 can include a PCR chamber 814, a PCR purification chamber 816, a flow restrictor, a vertical flow-splitter that leads to a forward sequencing chamber 818 and a reverse sequencing chamber 820, a forward sequencing product purification chamber 822, a reverse sequencing product purification chamber 824, a purified forward sequencing product output chamber 826, a purified reverse sequencing product output chamber 828, a plurality of opening and closing valves, or a combination thereof. The thermal device 600 of FIG. 3 can thermally regulate fluids disposed in the various chambers of the microfluidic device 800. The thermal device 600 of FIG. 3 can thermally regulate fluids disposed in the PCR chamber 814 and the PCR purification chamber 816 for each pathway 803. The thermal device 600 of FIG. 3 can thermally regulate fluids disposed in the forward sequencing chamber 818, the reverse sequencing chamber 820, the forward sequencing product purification chamber 822, and a reverse sequencing product purification chamber 824, for each pathway 803. Exemplary volumes for each of the chambers can be from 0.01 micro liters to about 100 micro liters.

According to various embodiments, the thermal device can be an assembly. The assembly can include several components that can be stacked or assembled together to form a single-side thermal device. The assembly can include, for example, a cold block, one or more thermoelectric devices, a first hot block, one or more thermoelectric devices, and another cold block. This embodiment of the thermal device can provide one hot region and two cold regions on fluid processing device, for example, thermal device 140 of FIG. 2. The thermal device assembly can be augmented by adding one or more thermoelectric devices, a first hot block, one or more thermoelectric devices, and another cold block to the thermal device as desired, for example, thermal device 600 of FIG. 3. A system can include a thermal device providing a plurality of hot blocks, for example, one, two or three hot blocks for the device of FIG. 8 for heating, two, four or six hot blocks for the device of FIG. 9. The hot blocks can correspond to a PCR chamber, a forward sequencing chamber and/or a reverse sequencing chamber of the microfluidic devices illustrated in FIG. 8 and FIG. 9, as desired. The hot blocks can be heated by operating adjacent thermoelectric devices, as desired.

Figure 10:
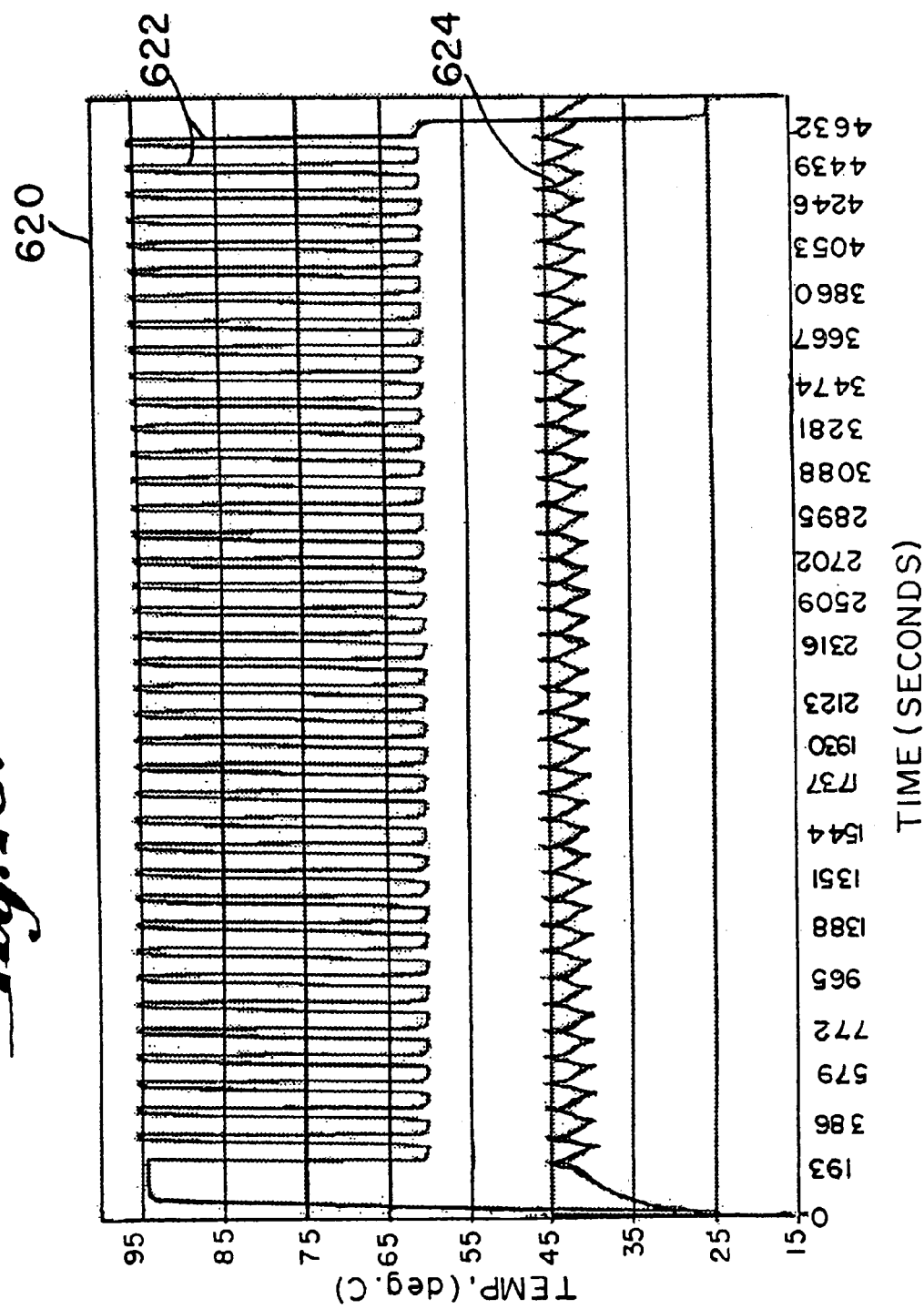
FIG. 10 is a chart of temperatures, plotting the temperatures of a first fluid in a first fluid retainment region and a second fluid in a second fluid retainment region, according to various embodiments.

The chart 620 of FIG. 10 is an example of a fluid being subjected to a thermal protocol such as PCR. A temperature plot 622 tracks the fluid temperature over time. The fluid was disposed in a fluid retainment region of a fluid processing device, for example, fluid retainment region 121 of FIG. 2, or fluid retainment region 514 of FIG. 8. A dual-sided thermal device, for example, the dual-sided thermal system 100 of FIG. 2, was utilized to obtain the plot. The fluid retainment region was in thermal contact with two hot blocks, for example, hot blocks 102 of FIG. 2. The fluid temperature plot 622 cycles in the range from about 55° C. to about 95° C. The temperature plot 624 depicts the temperature of a fluid in a second fluid retainment region, for example, a purification region. The second fluid retainment region, for example, fluid retainment region 122 of FIG. 2, fluid retainment region 516 of FIG. 8, can be in contact with two cold blocks, for example, cold blocks 106 of FIG. 2. The temperature of the second fluid retainment region can fluctuate in the range of from about 40° C. to about 45° C. According to various embodiments, the temperature measured for the fluid retainment region can fluctuate in a range of at least, for example, about 20° C., or about a 40° C. range, while the temperature of the second fluid retainment region fluctuates over a range of, for example, less than about 5° C., or less than about 10° C.

Figure 11:
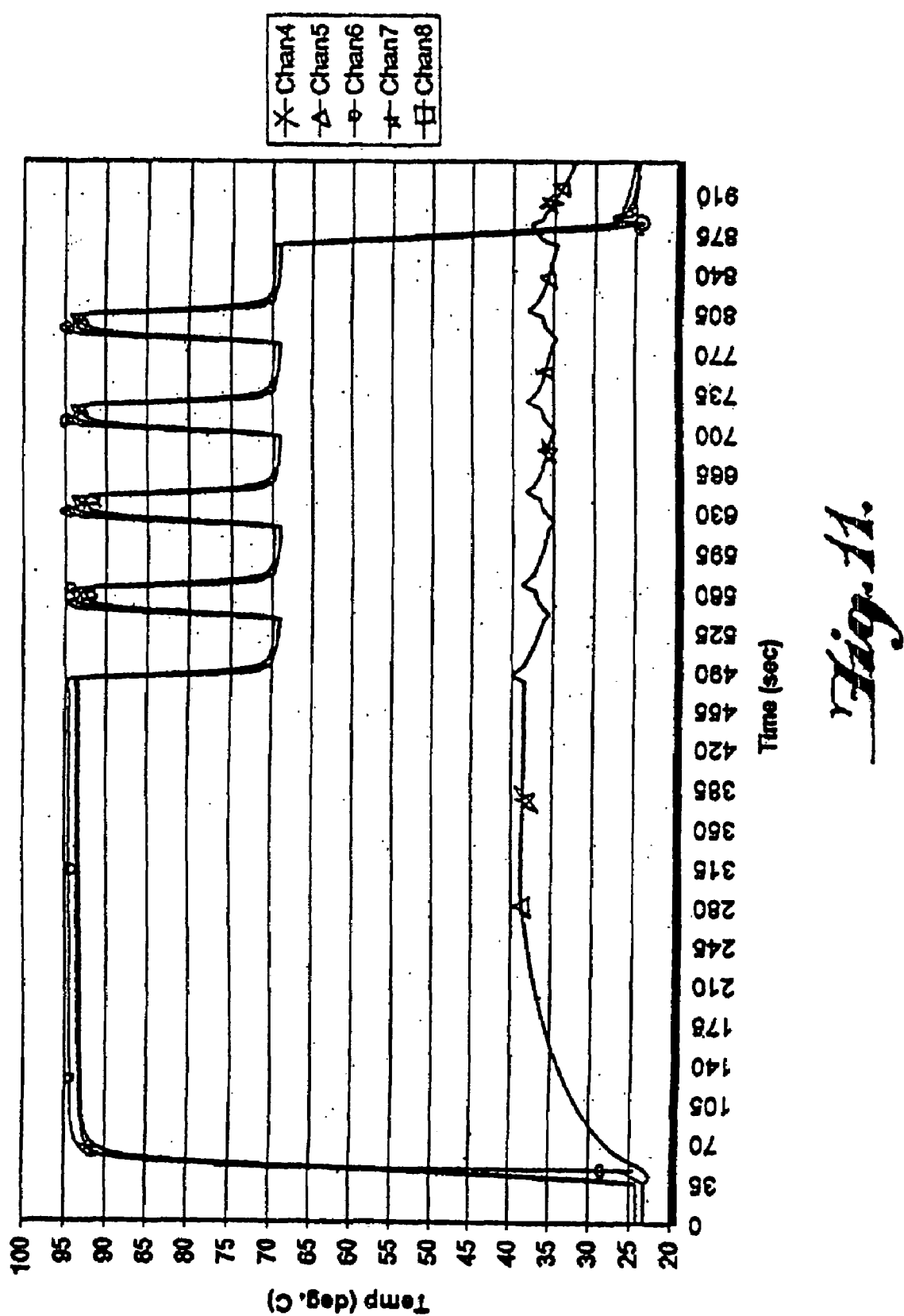
FIG. 11 is a graph that plots the temperatures of five fluid retainment regions, versus time, achieved according to various embodiments.

Example. FIG. 11 is a chart of temperatures obtained using five thermocouples embedded or buried within a plastic card. The thermocouples were obtained from Omega Engineering. Data was acquired using LabView software from National Instruments of Austin, Tex. using their off-the shelf data acquisition PC board (see, www.ni.com/labview). A depression was machined in a surface of the substrate. The depression allowed for a flush placement, with respect the machined surface, of thermocouples and their respective signal wires in the substrate. A cover film was placed over the thermocouples. A single-sided thermal device including a hot block and a cold block was placed in thermal contact with the cover film. The thermal device was thermo-cycled by a control device to follow the PCR protocol. Data tracks designated Chan4, Chan6, and Chan8 tracked temperatures reported by some of the thermocouples, linearly arranged, in thermal contact with the hot block. Data tracks designated Chan5 and Chan7 tracked temperatures reported by some of the thermocouples, linearly arranged, in thermal contact with the cold block. The hot block was offset from the cold block by about 6 mm. A pressing device was used to sandwich the plastic card with the embedded thermocouples. A single-sided thermal device was disposed on one side of the plastic card. A device including a first aluminum block, a plastic hot block, a second aluminum block, and two fans directing air flow over the first and second aluminum blocks, was disposed on the other side or opposing surface of the plastic card.

According to various embodiments, a fluid processing device can be used to manipulate a fluid, for example, a micro-sized fluid sample. The fluid sample can be subjected to at least two reactions in at least two respective reactions wells formed in the fluid processing device. The at least two reactions can transpire serially. A latter reaction within the set of the at least two reactions can use the product of the preceding reaction. The latter reaction well can be loaded with some reagents prior to activating a first reaction of the at least two reactions. According to various embodiments, to remain operative some of the reagents in the latter reaction well can require that the latter reaction well be maintained at a preservative temperature range exclusive and/or partially overlapping of thermal parameters of a reaction transpiring in the first well. According to various embodiments, a thermal device adapted to maintain the at least two reaction wells at different thermal parameters is described herein.

According to various embodiments, a fluid processing device can be used to manipulate at least two fluid samples, for example, at least two micro-sized fluid samples. The at least two fluid samples can be subjected to at least two reactions in at least two respective reaction wells formed in the fluid processing device. The at least two reactions can require mutually exclusive and/or partially overlapping thermal parameters to transpire in parallel or at the same time.

According to various embodiments, in a PCR device a PCR sample can be cycled in the temperature range of about 50° C. to about 95° C. A second fluid retainment region on the fluid processing device can concomitantly contain some size-exclusion ion-exchange (SEIE) beads. The SEIE beads can be rendered inoperative or less effective, when subjected to temperatures above about 50° C. Alternatively or additionally, the inadvertent heating of adjacent fluid retainment regions, for example, a second fluid retainment region, in the fluid processing device can expand any air contained therein. The air expansion can cause the adjacent fluid retainment regions and/or a seal disposed in the adjacent fluid retainment regions to burst or "blow-out." Similar thermal parameters can be imposed by a sequencing device including a sequencing-fluid retainment region and a sequencing purification fluid retainment region containing SEIE beads. The thermal parameter requirements for a plurality of reactions can proliferate as an increasing number of reactions can transpire in a fluid processing device, for example, a fluid processing device including a PCR fluid retainment region, a PCR-purification fluid retainment region, a sequencing fluid retainment region, a sequencing purification fluid retainment region. The fluid processing device can additionally or alternatively include a forward sequencing fluid retainment region, a forward sequencing purification fluid retainment region, a reverse sequencing fluid retainment region, a reverse sequencing purification fluid retainment region. According to various embodiments, a fluid processing device can include a reaction region for an Oligonucleotide Ligation Assay isothermal biological assay.

Other embodiments will be apparent to those skilled in the art from consideration of the present specification and practice of various embodiments disclosed herein. It is intended that the present specification and examples be considered as exemplary only with a true scope and spirit indicated by the teachings and equivalents thereof.

What is claimed is:

1. A method comprising:
   providing a fluid processing device including at least one fluid processing pathway that comprises including at least a first fluid retainment region, a second fluid retainment region, and a fluid communication between the first fluid retainment region and the second fluid retainment region;
   providing one or more thermal devices, each thermal device including
      a first block having a thermal conductivity greater than 0.5 W/cm·K,
      a second block having a thermal conductivity greater than 0.5 W/cm·K, and
      a heat-pump device disposed adjacent the first block and the second block;
   transferring thermal energy from at least one of the first block and the second block to the other of the first block and the second block using the heat-pump device;
   holding the fluid processing device in a heat-transfer position wherein the first fluid retainment region is in thermal contact with the first block and the second fluid retainment region is in thermal contact with the second block;
   providing a second thermal device including a third block having a thermal conductivity greater than 0.5 W/cm·K, a fourth block having a thermal conductivity greater than 0.5 W/cm·K, and a second heat-pump device disposed between the third block and the fourth block;
   transferring thermal energy from at least one of the third block and the fourth block to the other of the third block and the fourth block; and
   positioning the second thermal device wherein the third block is in the heat-transfer position with respect to the first fluid retainment region and the fourth block is in the heat-transfer position with respect to the second fluid retainment region.

2. The method of claim 1, further comprising controlling the heat-pump device to provide the first block with a temperature that is greater than the temperature of the second block.

3. The method of claim 2, wherein said controlling comprises
   heating the first block to about 95° C.; and
   maintaining the temperature of the second block to be less than about 50° C.

4. The method of claim 2, wherein said controlling comprises controlling the temperature of the first block to be at least about 40° C. greater than the temperature of the second block.

5. The method of claim 2, wherein said controlling further comprises inverting a direction of the thermal transfer between the first block and the second block.

6. The method of claim 1, further comprising controlling the heat-pump device to transfer heat from the first block to the second block and to transfer heat from the second block to the first block.

7. The method of claim 1, further comprising heating the first block with a heat-generating device.

8. The method of claim 1, further comprising creating an air-current in thermal contact with at least one of the first block and the second block.

9. The method of claim 1, further comprising cycling a temperature of the first block from a first temperature to a second temperature, and back to the first temperature.

10. The method of claim 1, further comprising forcing at least one of the first block and the second block into thermal contact with the fluid processing device.

11. The method of claim 1, further comprising positioning the fluid processing device and the thermal device with respect to one another.

12. A method comprising:
    providing a fluid processing device including at least one fluid processing pathway that comprises including at least a first fluid retainment region, a second fluid retainment region, and a fluid communication between the first fluid retainment region and the second fluid retainment region;
    providing one or more thermal devices, each thermal device including
       a first block having a thermal conductivity greater than 0.5 W/cm·K,
       a second block having a thermal conductivity greater than 0.5 W/cm·K, and
       a heat-pump device disposed adjacent the first block and the second block;
    transferring thermal energy from at least one of the first block and the second block to the other of the first block and the second block using the heat-pump device; and
    holding the fluid processing device in a heat-transfer position wherein the first fluid retainment region is in thermal contact with the first block and the second fluid retainment region is in thermal contact with the second block, wherein the thermal device further includes a third block having a thermal conductivity greater than 0.5 W/cm·K and a second heat-pump device disposed between the first block and the third block, the second heat-pump device being adapted to transfer thermal energy from at least one of the first block and the third block to the other of the first block and the third block.

13. The method of claim 12, further comprising controlling the heat-pump device to provide the first block with a temperature that is greater than the temperature of the second block.

14. The method of claim 13, wherein said controlling comprises
heating the first block to about 95° C.; and
maintaining the temperature of the second block to be less than about 50° C.

15. The method of claim 13, wherein said controlling comprises controlling the temperature of the first block to be at least about 40° C. greater than the temperature of the second block.

16. The method of claim 13, wherein said controlling further comprises inverting a direction of the thermal transfer between the first block and the second block.

17. The method of claim 12, further comprising controlling the heat-pump device to transfer heat from the first block to the second block and to transfer heat from the second block to the first block.

18. The method of claim 12, further comprising heating the first block with a heat-generating device.

19. The method of claim 12, further comprising creating an air-current in thermal contact with at least one of the first block and the second block.

20. The method of claim 12, further comprising cycling a temperature of the first block from a first temperature to a second temperature, and back to the first temperature.

21. The method of claim 12, further comprising forcing at least one of the first block and the second block into thermal contact with the fluid processing device.

22. The method of claim 12, further comprising positioning the fluid processing device and the thermal device with respect to one another.

23. A method comprising:
providing a fluid processing device including at least one fluid processing pathway that comprises including at least a first fluid retainment region, a second fluid retainment region, and a fluid communication between the first fluid retainment region and the second fluid retainment region;
providing one or more thermal devices, each thermal device including
a first block having a thermal conductivity greater than 0.5 W/cm·K,
a second block having a thermal conductivity greater than 0.5 W/cm·K, and
a heat-pump device disposed adjacent the first block and the second block;
transferring thermal energy from at least one of the first block and the second block to the other of the first block and the second block using the heat-pump device;
holding the fluid processing device in a heat-transfer position wherein the first fluid retainment region is in thermal contact with the first block and the second fluid retainment region is in thermal contact with the second block;
loading a first set of materials reactive at a first temperature range into the first fluid retainment region; and
loading a second set of materials into the second fluid retainment region wherein the second set of materials can be rendered substantially ineffective when subjected to the first temperature range.

24. The method of claim 23, wherein the first set of materials comprises nucleic acid amplification reagents.

25. The method of claim 24, wherein the nucleic acid amplifying reagents comprise polymerase chain reaction reagents.

26. The method of claim 24, wherein the nucleic acid amplifying reagents comprise oligonucleotide ligase reaction reagents.

27. The method of claim 23, wherein the second set of materials comprise size-exclusion ion-exchange beads.

28. The method of claim 23, further comprising controlling the heat-pump device to provide the first block with a temperature that is greater than the temperature of the second block.

29. The method of claim 28, wherein said controlling comprises
heating the first block to about 95° C.; and
maintaining the temperature of the second block to be less than about 50° C.

30. The method of claim 28, wherein said controlling comprises controlling the temperature of the first block to be at least about 40° C. greater than the temperature of the second block.

31. The method of claim 28, wherein said controlling further comprises inverting a direction of the thermal transfer between the first block and the second block.

32. The method of claim 23, further comprising controlling the heat-pump device to transfer heat from the first block to the second block and to transfer heat from the second block to the first block.

33. The method of claim 23, further comprising heating the first block with a heat-generating device.

34. The method of claim 23, further comprising creating an air-current in thermal contact with at least one of the first block and the second block.

35. The method of claim 23, further comprising cycling a temperature of the first block from a first temperature to a second temperature, and back to the first temperature.

36. The method of claim 23, further comprising forcing at least one of the first block and the second block into thermal contact with the fluid processing device.

37. The method of claim 23, further comprising positioning the fluid processing device and the thermal device with respect to one another.

38. A method comprising:
providing a fluid processing device including at least one fluid processing pathway that comprises including at least a first fluid retainment region, a second fluid retainment region, and a fluid communication between the first fluid retainment region and the second fluid retainment region;
providing one or more thermal devices, each thermal device including
a first block having a thermal conductivity greater than 0.5 W/cm·K,
a second block having a thermal conductivity greater than 0.5 W/cm·K, and
a heat-pump device disposed adjacent the first block and the second block;
transferring thermal energy from at least one of the first block and the second block to the other of the first block and the second block using the heat-pump device;
holding the fluid processing device in a heat-transfer position wherein the first fluid retainment region is in thermal contact with the first block and the second fluid retainment region is in thermal contact with the second block;
loading a target nucleic acid material and amplifying reagents into the first fluid retainment region;
amplifying the nucleic acid material by thermal cycling the first fluid retainment region; and
loading size-exclusion ion exchange beads into the second fluid retainment region.

39. A method comprising:

providing a fluid processing device including a plurality of fluid processing pathways, each pathway comprising at least a first fluid retainment region, a second fluid retainment region, and a fluid communication between the first fluid retainment region and the second fluid retainment region;

providing one or more thermal devices, each thermal device including
 a first block having a thermal conductivity greater than 0.5 W/cm·K,
 a second block having a thermal conductivity greater than 0.5 W/cm·K, and
 a heat-pump device disposed adjacent the first block and the second block;

transferring thermal energy from at least one of the first block and the second block to the other of the first block and the second block using the heat-pump device;

holding the fluid processing device in a heat-transfer position wherein the first fluid retainment regions of the plurality of pathways are in thermal contact with the first block and the second fluid retainment regions of the plurality of pathways are in thermal contact with the second block;

providing a second thermal device including a third block having a thermal conductivity greater than 0.5 W/cm·K, a fourth block having a thermal conductivity greater than 0.5 W/cm·K, and a second heat-pump device disposed between the third block and the fourth block;

transferring thermal energy from at least one of the third block and the fourth block to the other of the third block and the fourth block; and positioning the second thermal device wherein the third block is in the heat-transfer position with respect to the plurality of first fluid retainment regions and the fourth block is in the heat-transfer position with respect to the plurality of second fluid retainment regions.

40. A method comprising:
providing a fluid processing device including a plurality of fluid processing pathways, each pathway comprising at least a first fluid retainment region, a second fluid retainment region, and a fluid communication between the first fluid retainment region and the second fluid retainment region;

providing one or more thermal devices, each thermal device including
 a first block having a thermal conductivity greater than 0.5 W/cm·K,
 a second block having a thermal conductivity greater than 0.5 W/cm·K, and
 a heat-pump device disposed adjacent the first block and the second block;

transferring thermal energy from at least one of the first block and the second block to the other of the first block and the second block using the heat-pump device; and holding the fluid processing device in a heat-transfer position wherein the first fluid retainment regions of the plurality of pathways are in thermal contact with the first block and the second fluid retainment regions of the plurality of pathways are in thermal contact with the second block;

wherein the thermal device further includes a third block having a thermal conductivity greater than 0.5 W/cm·K and a second heat-pump device disposed between the first block and the third block, the second heat-pump device being adapted to transfer thermal energy from at least one of the first block and the third block to the other of the first block and the third block.

41. A method comprising:
providing a fluid processing device including a plurality of fluid processing pathways, each pathway comprising at least a first fluid retainment region, a second fluid retainment region, and a fluid communication between the first fluid retainment region and the second fluid retainment region;

providing one or more thermal devices, each thermal device including
 a first block having a thermal conductivity greater than 0.5 W/cm·K,
 a second block having a thermal conductivity greater than 0.5 W/cm·K, and
 a heat-pump device disposed adjacent the first block and the second block;

transferring thermal energy from at least one of the first block and the second block to the other of the first block and the second block using the heat-pump device;

holding the fluid processing device in a heat-transfer position wherein the first fluid retainment regions of the plurality of pathways are in thermal contact with the first block and the second fluid retainment regions of the plurality of pathways are in thermal contact with the second block;

loading a first set of materials reactive at a first temperature range into the first fluid retainment regions of the plurality of pathways; and loading a second set of materials into the second fluid retainment regions of the plurality of pathways wherein the second set of materials can be rendered substantially ineffective when subjected to the first temperature range.

42. The method of claim 41, wherein the first set of materials comprises nucleic acid amplification reagents.

43. The method of claim 42, wherein the nucleic acid amplifying reagents comprise polymerase chain reaction reagents.

44. The method of claim 42, wherein the nucleic acid amplifying reagents comprise oligonucleotide ligase reaction reagents.

45. The method of claim 41, wherein the second set of materials comprise size-exclusion ion-exchange beads.

46. A method comprising:
providing a fluid processing device including a plurality of fluid processing pathways, each pathway comprising at least a first fluid retainment region, a second fluid retainment region, and a fluid communication between the first fluid retainment region and the second fluid retainment region;

providing one or more thermal devices, each thermal device including
 a first block having a thermal conductivity greater than 0.5 W/cm·K,
 a second block having a thermal conductivity greater than 0.5 W/cm·K, and
 a heat-pump device disposed adjacent the first block and the second block;

transferring thermal energy from at least one of the first block and the second block to the other of the first block and the second block using the heat-pump device;

holding the fluid processing device in a heat-transfer position wherein the first fluid retainment regions of the plurality of pathways are in thermal contact with the first block and the second fluid retainment regions of the plurality of pathways are in thermal contact with the second block;

loading a target nucleic acid material and amplifying reagents into the first fluid retainment region;
amplifying the nucleic acid material by thermal cycling the first fluid retainment region; and
loading size-exclusion ion exchange beads into the second fluid retainment regions of the plurality of pathways.

* * * * *